United States Patent
Belchee et al.

(10) Patent No.: US 12,184,772 B1
(45) Date of Patent: Dec. 31, 2024

(54) METHODS, APPARATUSES, AND COMPUTER PROGRAM PRODUCTS FOR GENERATION AND USE OF MOBILE LEGAL IDENTIFICATION DATA OBJECTS

(71) Applicant: Wells Fargo Bank, N.A., San Francisco, CA (US)

(72) Inventors: William Blakely Belchee, Charlotte, NC (US); Bradley Long, Charlotte, NC (US); Matthew N. Wheeler, Charlotte, NC (US); Matthew Brookshire, Salt Lake City, UT (US)

(73) Assignee: Wells Fargo Bank, N.A., San Francisco, CA (US)

( * ) Notice: Subject to any disclaimer, the term of this patent is extended or adjusted under 35 U.S.C. 154(b) by 223 days.

(21) Appl. No.: 18/054,362

(22) Filed: Nov. 10, 2022

Related U.S. Application Data

(60) Provisional application No. 63/282,476, filed on Nov. 23, 2021.

(51) Int. Cl.
*H04L 9/08* (2006.01)
*G06Q 50/18* (2012.01)

(52) U.S. Cl.
CPC ........... *H04L 9/0861* (2013.01); *G06Q 50/18* (2013.01)

(58) Field of Classification Search
CPC .......... H04L 9/0861; H04L 9/32; H04L 63/08

USPC ......................................................... 713/171
See application file for complete search history.

(56) References Cited

U.S. PATENT DOCUMENTS

| | | | |
|---|---|---|---|
| 11,935,035 B2 * | 3/2024 | Rule ..................... | G06Q 20/354 |
| 2010/0048175 A1 * | 2/2010 | Osborn ............... | H04W 12/069 |
| | | | 455/411 |
| 2017/0331809 A1 * | 11/2017 | Feng ................... | G06Q 20/3276 |
| 2017/0357971 A1 * | 12/2017 | Pitz ...................... | H04W 4/021 |
| 2018/0173906 A1 * | 6/2018 | Rodriguez ............ | H04L 9/3213 |
| 2020/0167767 A1 * | 5/2020 | Wouters .................. | H04L 63/08 |

* cited by examiner

*Primary Examiner* — Teshome Hailu
(74) *Attorney, Agent, or Firm* — K&L Gates LLP

(57) ABSTRACT

Methods, apparatuses, and computer program products are disclosed for generating and/or using a mobile legal identification data object. An example method includes receiving a request for a mobile legal identification data object and generating the mobile legal identification data object based at least in part on the request for the mobile legal identification data object. The method further includes associating the mobile legal identification data object with a user profile. The method further includes providing the mobile legal identification data object to a user device associated with the user profile.

20 Claims, 13 Drawing Sheets

METHODS, APPARATUSES, AND COMPUTER PROGRAM PRODUCTS FOR GENERATION AND USE OF MOBILE LEGAL IDENTIFICATION DATA OBJECTS

CROSS REFERENCE TO RELATED APPLICATIONS

The present application claims the benefit of U.S. Provisional Application No. 63/282,476, filed Nov. 23, 2021, which is hereby incorporated by reference in its entirety

TECHNOLOGICAL FIELD

Example embodiments of the present disclosure relate generally to user authentication and verification and, more particularly, to the generation of mobile legal identification data objects.

BACKGROUND

Authentication action requests may originate from user devices and may request one or more actions, events, operations, and/or the like from a receiving computing entity. The ability to supply necessary user data, however, may often be limited by the ability of a user to provide legal identification, such as in the form of a driver's license. Furthermore, legal identification information may be subject to fraudulent activity in that an entity may be unable to verify that information received from a particular user is valid and associated with the particular user.

BRIEF SUMMARY

Computer-implemented methods, apparatuses, and computer program products are provided for generation and use of mobile legal identification data objects. An example computer-implemented method may include receiving a mobile legal identification request, wherein the mobile legal identification request incudes at least one or more user identifiers and legal identification document data and is associated with a mobile legal identification type. The method may include generating a mobile legal identification authorization request based at least in part on the mobile legal identification type of the mobile legal identification request, wherein the mobile legal identification authorization request includes the one or more user identifiers and legal identification document data and providing the mobile legal identification authorization request to one or more issuer computing devices. The method may include receiving a mobile legal identification authorization response, wherein in an instance the mobile legal identification authorization response is affirmative, the mobile legal identification authorization response includes one or more legal identification data objects. The method may further include generating the mobile legal identification data object based at least in part on the received mobile legal identification authorization response and providing the mobile legal identification data object to a user device associated with the one or more user identifiers.

In some embodiments, the method may further include storing the mobile legal identification data object in a user profile, wherein the user profile in which the mobile legal identification data object is stored is based at least in part on the one or more user identifiers.

In some embodiments, the method may further include determining whether the one or more user identifiers are associated with one or more existing user profiles and, in an instance the one or more user identifiers are determined to be associated with one or more existing user profiles, associating the mobile legal identification data object with the one or more existing user profiles. In an instance the one or more user identifiers are determined to not be associated with one or more existing user profiles, the method may further include generating a user profile and associating the mobile legal identification data object with the generated user profile.

In some embodiments, the mobile legal identification data object may include at least one of one or more images of a legal identification document, one or more images of a user associated with the legal identification document, or one or more authentication factors.

In some embodiments, the one or more user identifiers may include at least one of a phone number, existing account username, social security number, existing account identifier, email address, or customer identifier.

In some embodiments, generating the mobile legal identification data object may further include providing a verification request data object to the user device associated with the one or more user identifiers, and in an instance an affirmative verification response data object is received from the user device, generating the mobile legal identification authorization request.

In some further embodiments, in an instance an affirmative verification response data object is not received from the user device, the method may include providing a potential fraudulent data object to the user device, wherein the potential fraudulent data object is indicative of a failed attempt of to generate the mobile legal identification data object.

In some embodiments, the method may include receiving one or more update event data objects from the one or more legal issuer computing devices and updating the mobile legal identification data object based at least in part on the one or more update event data objects.

In some embodiments a computer-implemented method for dynamically providing a mobile legal identification data object in response to one or more authentication action requests is provided. The method may include receiving one or more authentication action requests, wherein the one or more authentication action requests include authentication action metadata and one or more user identifiers. The method may further include accessing a mobile legal identification data object stored in a user profile and providing an authentication action response, wherein the authentication action response includes at least the mobile legal identification data object.

In some embodiments, providing the mobile legal identification data object to the one or more external user devices further includes providing a user authorization interaction data object to the user device, wherein the user authorization interaction data object includes one or more inputs for a user response. The method may further include determining, using an authorization action determination machine learning model, one or more authorization match scores based at least in part on the one or more user responses provided by the one or more inputs and one or more user attributes stored in the user profile and providing the authentication action response based at least in part on the one or more authorization match scores.

In some further embodiments, the one or more inputs for the user response may include one or more of a fingerprint scan, face profile scan, retina scan, voice capture, or user passcode.

In other further embodiments, the one or more user attributes may include a user fingerprint scan, face profile scan, retina scan, voice capture, or user passcode.

In some embodiments, providing an authentication action response further includes determining an authorization access category associated with the one or more authentication action requests, wherein the authentication action response further includes one or more decryption keys based at least in part on the authorization access category associated with the one or more authentication action requests.

In some embodiments, the mobile legal identification data object may be provided to one or more external user devices via near-field communication, Bluetooth communication, causing display of a QR code identifier, or causing the display of a barcode identifier.

In some embodiments, the method may further include storing the one or more authentication action requests in a user profile.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1:
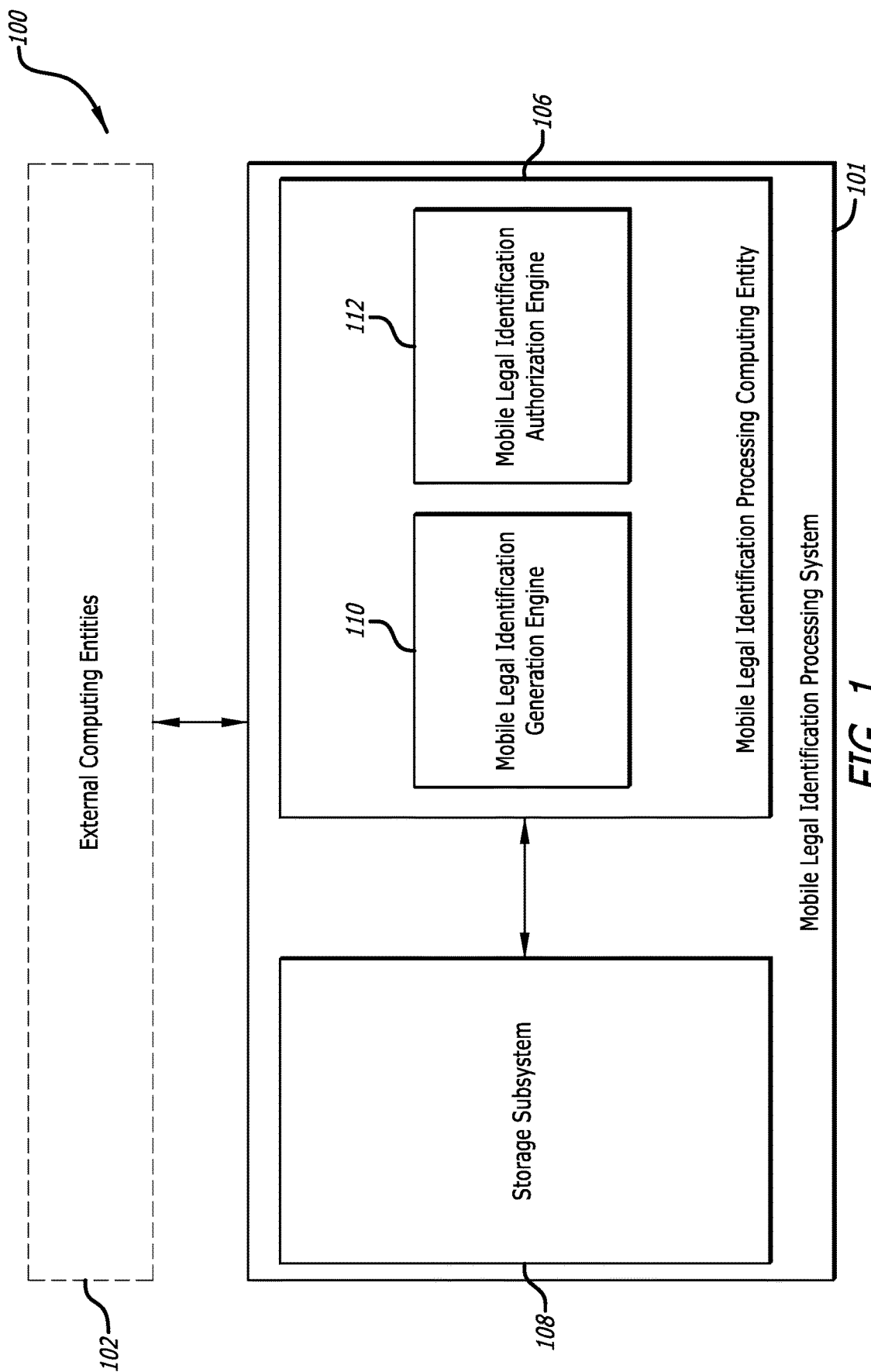
FIG. 1 illustrates an exemplary overview of a system that may be used to practice embodiments of the present disclosure.

Some embodiments of the present disclosure will now be described more fully hereinafter with reference to the accompanying drawings, in which some, but not all embodiments of the disclosure are shown. Indeed, these embodiments may be embodied in many different forms and should not be construed as limited to the embodiments set forth herein; rather, these embodiments are provided so that this disclosure will satisfy applicable legal requirements. Like numbers refer to like elements throughout. As used herein, the description may refer to mobile legal identification processing system or computing entity as an example "apparatus." However, elements of the apparatus described herein may be equally applicable to the claimed method and computer program product. Thus, use of any such terms should not be taken to limit the spirit and scope of embodiments of the present disclosure.

Definition of Certain Terms

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

As used herein, the terms "user device," "mobile device," "electronic device" and the like refer to computer hardware that is configured (either physically or by the execution of software) to access one or more services made available by a real-time payment server (e.g., apparatus or computing device of the present disclosure) and, among various other functions, is configured to directly, or indirectly, transmit and receive data. Example user devices may include a smartphone, a tablet computer, a laptop computer, a wearable device (e.g., smart glasses, smart watch, or the like), and the like. In some embodiments, a user device may include a "smart device" that is equipped with a chip or other electronic device that is configured to communicate with the apparatus via Bluetooth, NFC, Wi-Fi, 3G, 4G, 5G, RFID protocols, and the like. By way of a particular example, a user device may be a mobile phone equipped with a Wi-Fi radio that is configured to communicate with a Wi-Fi access point that is in communication with the mobile legal identification processing computing entity 106 or other computing devices via a network.

As used herein, the term "mobile legal identification request" may refer to electronically received data object associated with a request from a user to generate a mobile legal identification data object for the user. Each mobile legal identification request may correspond to a mobile legal identification type from amongst a plurality of candidate mobile legal identification types which may identify a particular user. For example, candidate mobile legal identification types may include a mobile driver's license, birth certificate, state-issued identifier, student identifier, social security card, military card, passport, and/or the like. In some embodiments, the mobile legal identification request includes mobile legal identification metadata and a user identifier. The user identifier may be any identifier which identifies a user associated with the mobile legal identification request. For example, a user identifier may include a username, account number, phone number, email address, customer identifier, and/or the like. The mobile legal identification request metadata may include one or more attributes describing any data associated with the requesting user, user device, and/or mobile legal identification request. For example, the mobile legal identification request metadata may describe attributes including one or more of event data, user device information, location data, user biometric data, user device interaction information, and/or the like. In some embodiments, the mobile legal identification request may additionally include legal identification document data. For example, legal identification document data may include one or more images of a legal identification document, one or more images of a user associated with the legal identification document, and/or one or more authentication factors to be associated with the mobile legal identification data object.

As used herein, the term "mobile legal identification data object" may refer to an electronically generated data object configured to describe a collection of content data (e.g., text data, barcode data, image data, scannable indicia, and/or the like) that is associated with a particular user. In some embodiments, the mobile legal identification data object is associated with a particular legal identification issuer (e.g., state, federal, and/or private institution). The mobile legal identification data object may be configured to describe legal identification data. For example, legal identification data may include one or more images of a legal identification document, one or more images of a user associated with the legal identification document, one or more authentication factors, and/or the like. The mobile legal identification data object may be stored in an encrypted manner within a user profile. In some embodiments, one or more mobile legal identification data elements may be encrypted based at least in part on one or more mobile legal document key generation models. Furthermore, one or more mobile legal identification data elements within the mobile legal identification data object may be associated with an authorization access category.

As used herein, the term "mobile legal identification key generation model" may refer to an electronically-stored data construct configured to describe stored operations of a cryptographic model that may generate one or more mobile legal identification encryption keys and/or one or more mobile legal identification decryption keys. The mobile legal identification key generation model may use any cryptographic algorithms. In some embodiments, the mobile legal identification key generation model may employ symmetric or asymmetric cryptography to generate one or more mobile legal identification encryption keys and/or one or more mobile legal identification decryption keys.

As used herein, the term "verification request data object" may refer to an electronically-generated data construct configured to confirm whether the mobile legal identification data object request associated with the user identifier is authentic. In some embodiments, the verification request data object may include mobile legal identification request data and/or mobile legal identification request metadata. For example, the verification request data object may include a time the mobile legal identification request was received, a location the mobile legal identification request was received, and/or the like. The verification request data object may also include one or more inputs for user response. For example, the one or more inputs for a user response may include a confirmation or denial indication such that a user may select a confirmation indication to confirm and/or authentic the mobile legal identification request or select the denial indication to decline the mobile legal identification request. In some embodiments, the verification request data object may further be associated with a maximum verification request time threshold. The maximum verification request time threshold may define a maximum duration of time between when the verification request is sent and when user input may be received. In an instance a user does not respond to the verification request data object within the time defined by the maximum verification request time threshold, the mobile legal identification request may automatically be declined.

As used herein, the term "verification response data object" may refer to an electronically-received data object configured to describe one or more user responses to a verification request data object. The verification response data object may describe one or more user interactions with the verification request data object. For example, the verification response data object may indicate whether an end user selected a confirmation indication, denial indication, or did not select an indication based at least in part on the one or more user inputs for the verification request data object.

As used herein, the term "update event data objects" may refer to an electronically-received data object configured to describe one or more events and/or updates to a mobile legal identification data object. For example, one or more events may include a revocation of the mobile legal identification data object, update of one or more mobile legal identification data elements, and/or the like.

As used herein, the term "authentication action request" may refer to an electronically received data object associated with a request from a user to perform one or more events, services, actions, functions, and/or the like for a corresponding user account. Each authentication action request may correspond to an authentication action request type of a plurality of candidate authentication action request types. For example, candidate authentication action request types may include a request for age identification, request to board a plane, request to rent a car, request for state service, request for full mobile legal identification document review, request to login to a user account, transfer funds to and/or from one or more financial accounts, change a password associated with a user account, open a new account for the user, check the status of one or more financial accounts, and/or the like. Furthermore, each authentication action request type may correspond to an authorization access category of a plurality of candidate authorization access categories. Each authorization access category may be associated with a set of one or more decryption rules configured to describe which decryption keys are to be provided with the mobile legal identification data object. In some embodiments, the authentication action request includes authentication action metadata and a user identifier. The user identifier may be any identifier which identifies a user associated with the authentication action request. For example, a user identifier may include a username, account number, phone number, email address, customer identifier, and/or the like. The authentication action request metadata may include one or more attributes describing any data associated with the requesting user, user device, and/or authentication request. For example, the authentication action request metadata may describe attributes including one or more of event data, user device information, location data, user biometric data, user device interaction information, and/or the like.

As used herein, the term "authentication action response" may refer to an electronically generated data object configured to describe an indication of whether an authentication action request was successful. The authentication action response may be generated and/or provided in response to a receipt of an authentication action request from a user device. The authentication action response may include the mobile legal identification data object and one or more decryption keys corresponding to the mobile legal identification data object. In some embodiments, the authentication action response may further include one or more next steps, operations, functions, and/or the like associated with the authentication action request.

As used herein, the term "user authorization interaction data object" may refer to an electronically-generated data construct which is generated in response to receipt of one or more authorization action requests and includes one or more inputs for a user response. In some embodiments, the one or more inputs for user response include one or more inputs for biometric data (e.g., fingerprint scan, face scan, vocal pattern capture, retina scan, and/or the like) and/or one or more user authentication attributes (e.g., a PIN number, passcode, and/or the like).

As used herein, the term "authorization action determination machine learning model" may refer to an electronically-stored data construct that is configured to describe parameters, hyper-parameters, and/or stored operations of a machine learning model that is configured to generate an authorization match score for a received user authorization interaction data object. In some embodiments, the authorization action determination machine learning model may be configured to process one or more received user authorization interaction data objects, a user interactions data object and/or one or more user attributes from an associated user profile to generate an authorization match score for the received user authorization interaction data object. In some embodiments, the authorization action determination machine learning model may be configured to generate the authorization match score for the received user authorization interaction data object based at least in part on an inferred similarity between one or more received user authorization interaction data objects, a user interactions data object and/or one or more user attributes from an associated user profile. In some embodiments, an authorization match score may be any numeric value. In some embodiments, the authorization action determination machine learning model may be configured to determine one or more authorization match score classifications for the authorization match score. The authorization match score classifications categories may include, but are not limited to, an authorized classification and a non-authorized classification. Each classification category may be defined by one or more authorization match score values. For example, a non-authorized classification category may be defined by authorization match score values between 0-65 and an authorized classification category may be defined by authorization match scores values between 66-100.

In some embodiments, the authorization action determination machine learning model may employ any suitable clustering algorithms including but not limited to affinity propagation, agglomerative clustering, balanced iterative reducing and clustering using hierarchies (BIRCH), density-based spatial clustering of applications with noise (DB-SCAN), k-means, mini-batch k-means, mean shift, ordering points to identify cluster structure (OPTICS), spectral clustering, mixture of Gaussians, and/or the like. In some embodiments, the authorization action determination machine learning model may cluster one or more user response attributes with one or more user attributes stored within a user profile. In some embodiments, the authorization match score may be based at least in part on inter-cluster distance between two or more clusters for a particular user attribute. For example, one cluster may correspond to a fingerprint pattern scan as received from a user authorization interaction data object and a finger pattern scan stored within the corresponding user profile. In some embodiments, each inter-cluster score for one or more attributes of the authorization interaction data object may be used to generate the authorization match score. In some embodiments, the authorization action determination machine learning model may be further configured to determine weights for each of the inter-cluster scores to generate the authorization match score for the user authorization interaction data object. In some embodiments, the one or more authorization action determination machine learning models may be trained to determine or to otherwise derive an optimal configuration and/or to optimize one or more associated hyperparameters. In some embodiments, the parameters and/or hyper-parameters of the authorization action determination machine learning model may be represented as one or more values, such as in an array. The present disclosure contemplates that the action trust score machine learning model may encompass any machine learning, artificial intelligence, or clustering technique and may similarly perform any machine learning technique.

Example Computer Program Products, Methods, and Computing Entities

Embodiments of the present disclosure may be implemented in various ways, including as computer program products. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatuses, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments may produce specifically-configured machines performing the steps or operations specified in the block diagrams and flowchart illustrations. Accordingly, the block diagrams and flowchart illustrations support various combinations of embodiments for performing the specified instructions, operations, or steps.

Exemplary System Framework

FIG. 1 is a schematic diagram of an example system architecture 100 for generating mobile legal identification data objects, receiving authentication action requests, and providing authentication action responses. The system architecture 100 includes a mobile legal identification processing system 101 including a mobile legal identification processing computing entity 106 configured to process request s for mobile legal identification data objects, generate mobile legal identification data objects, process authentication action requests, and/or provide authentication action responses. The mobile legal identification processing system 101 may, in some embodiments, communicate with one or more external computing entities 102 using one or more communication networks. Examples of communication networks include any wired or wireless communication network including, for example, a wired or wireless local area network (LAN), personal area network (PAN), metropolitan area network (MAN), wide arca network (WAN), or the like, as well as any hardware, software and/or firmware required to implement it (such as, e.g., network routers, and/or the like).

The system architecture 100 includes a storage subsystem 108 configured to store at least a portion of the data utilized by the mobile legal identification processing system 101. The mobile legal identification processing computing entity 106 may also be in communication with one or more external computing entities 102. The mobile legal identification processing computing entity 106 may be configured to receive requests for mobile legal identification data objects and/or data from external computing entities 102, generate the mobile legal identification data object, and/or provide the mobile legal identification data object to the external computing entities 102. Additionally or alternatively, the mobile legal identification processing computing entity 106 may be configured to receive authentication action requests and/or data from external computing entities 102, process the authentication action requests and/or data to access a mobile legal identification data object, and/or provide one or more authentication action responses to the external computing entities 102. Although illustrated in FIG. 1 as separate components, the present disclosure contemplates that, in some embodiments, the mobile legal identification processing system 101 and/or the mobile legal identification processing computing entity 106 may comprise the external computing entities 102.

The storage subsystem 108 may be configured to store at least a portion of the data utilized by the mobile legal identification processing computing entity 106 to perform mobile legal identification data object generation steps/operations and tasks and/or authentication authorization steps/operations and tasks. The storage subsystem 108 may be configured to store at least a portion of operational data and/or operational configuration data including operational instructions and parameters utilized by the mobile legal identification processing computing entity 106 to perform steps/operations in response to requests for mobile legal identification data object and/or authentication authorization requests. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

The mobile legal identification processing computing entity 106 includes a mobile legal identification generation engine 110 and a mobile legal identification authorization engine 112. The mobile legal identification generation engine 110 may be configured with circuitry and/or computer program code to generate one or more mobile legal identification data objects for one or more authentication action requests. The mobile legal identification authorization engine 112 may be configured with circuitry and/or computer program code to process an authentication action request and provide an authentication action response, and/or the like. The mobile legal identification authorization engine 112 may be configured with circuitry and/or computer program code to execute and/or operate one or more authorization action machine learning models to generate one or more authorization match scores for one or more authentication action requests based at least in part on the one or more user responses provided by the one or more inputs and one or more user attributes stored in the user profile.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the mobile legal identification processing computing entity 106 may provide or supplement the functionality of particular circuitry. The one or more action trust score machine learning models and/or device trust score machine learning models may be stored in the storage subsystem 108 or may be otherwise accessible by respective engines 110 and/or 112.

Exemplary Mobile Legal Identification Processing Computing Entity

Figure 2:
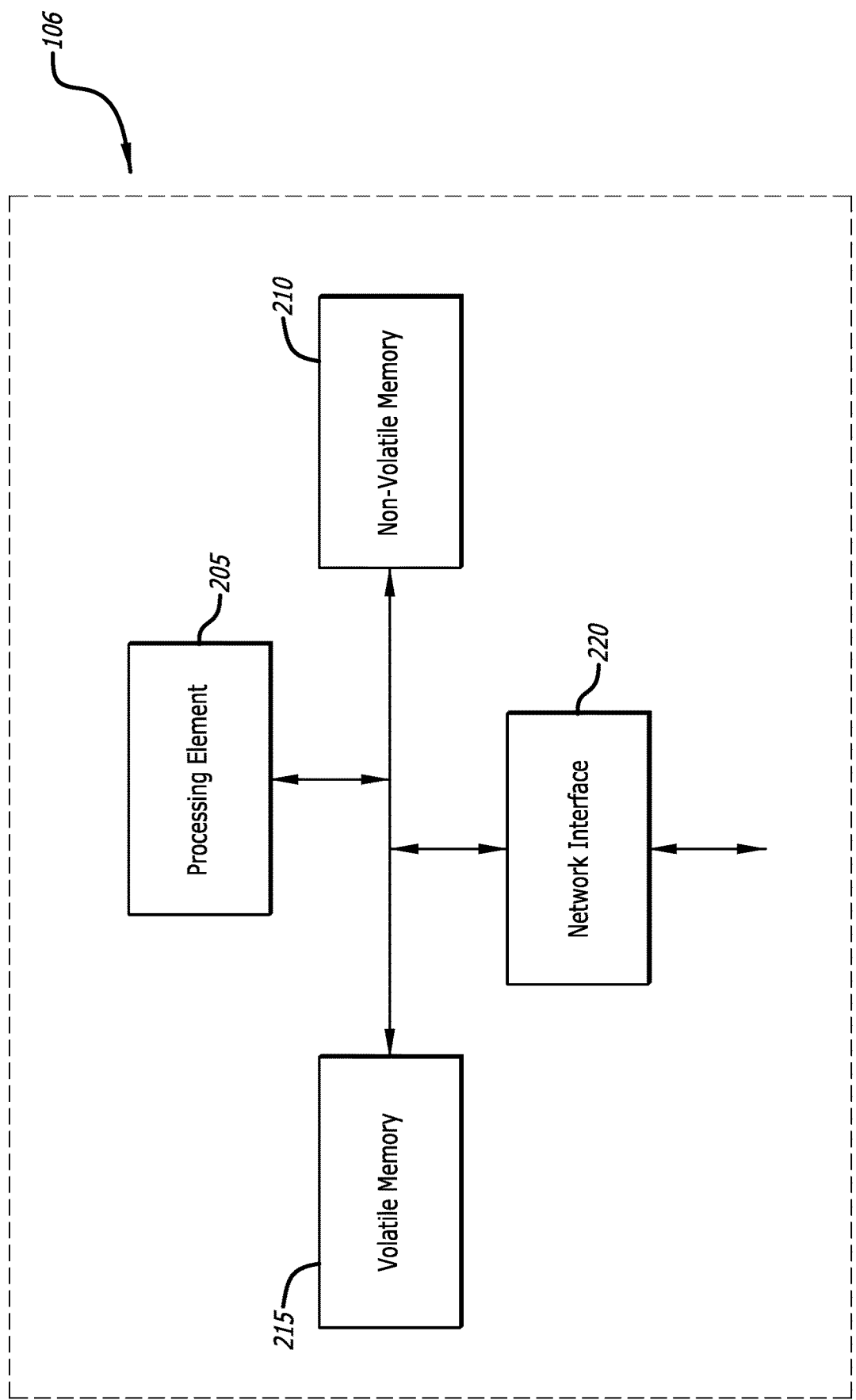
FIG. 2 illustrates an example mobile legal identification processing computing entity in accordance with some embodiments discussed herein.

FIG. 2 provides an example schematic of a mobile legal identification processing computing entity 106 according to one embodiment of the present disclosure. In general, the terms computing entity, computer, entity, device, system, controller, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Such functions, steps/operations, and/or processes may include, for example, transmitting, receiving, operating on, processing, displaying, storing, determining, creating/generating, monitoring, evaluating, comparing, and/or similar terms used herein interchangeably. In one embodiment, these functions, steps/operations, and/or processes may be performed on data, content, information, and/or similar terms used herein interchangeably.

As indicated, in one embodiment, the mobile legal identification processing computing entity 106 may also include a network interface 220 for communicating with various computing entities, such as by communicating data, content, information, and/or similar terms used herein interchangeably that may be transmitted, received, operated on, processed, displayed, stored, and/or the like. In some embodiments, the network interface may be configured to access a network via Bluetooth, NFC, Wi-Fi, 3G, 4G, 5G, RFID protocols, and the like. By way of a particular example, the network interface 220 may configured to communicate with the mobile legal identification processing system 101 or computing entity or other computing device via a network.

As shown in FIG. 2, in one embodiment, the mobile legal identification processing computing entity 106 may include or be in communication with a processing element 205 (also referred to as processors, processing circuitry, and/or similar terms used herein interchangeably) that communicate with other elements within the mobile legal identification processing computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media 215, 210 or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the mobile legal identification processing computing entity 106 may further include or be in communication with non-volatile media (also referred to as non-volatile storage, memory, memory storage, memory circuitry and/or similar terms used herein interchangeably). In one embodiment, the non-volatile storage or memory may include at least one non-volatile memory 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory 210 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the mobile legal identification processing computing entity 106 may further include or be in communication with volatile media (also referred to as volatile storage, memory, memory storage, memory circuitry and/or similar terms used herein interchangeably). In one embodiment, the volatile storage or memory may also include at least one volatile memory 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory 215 may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the mobile legal identification processing computing entity 106 with the assistance of the processing element 205 and operating system.

As indicated, in one embodiment, the mobile legal identification processing computing entity 106 may also include a network interface 220 for communicating with various computing entities, such as by communicating data, content, information, and/or similar terms used herein interchangeably that may be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the mobile legal identification processing computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, 4G, 5G, and/or any other wireless protocol.

Although not shown, the mobile legal identification processing computing entity 106 may include or be in communication with one or more input elements, such as a keyboard input, a mouse input, a touch screen/display input, motion input, movement input, audio input, pointing device input, joystick input, keypad input, and/or the like. The mobile legal identification processing computing entity 106 may also include or be in communication with one or more output elements (not shown), such as audio output, video output, screen/display output, motion output, movement output, and/or the like. By way of example, the mobile legal identification processing computing entity 106 may be, via the network interface 220, be configured to cause generation/presentation of a user interface displaying a mobile legal identification data object and/or authentication action response as described hereafter.

Exemplary External Computing Entity

Figure 3:
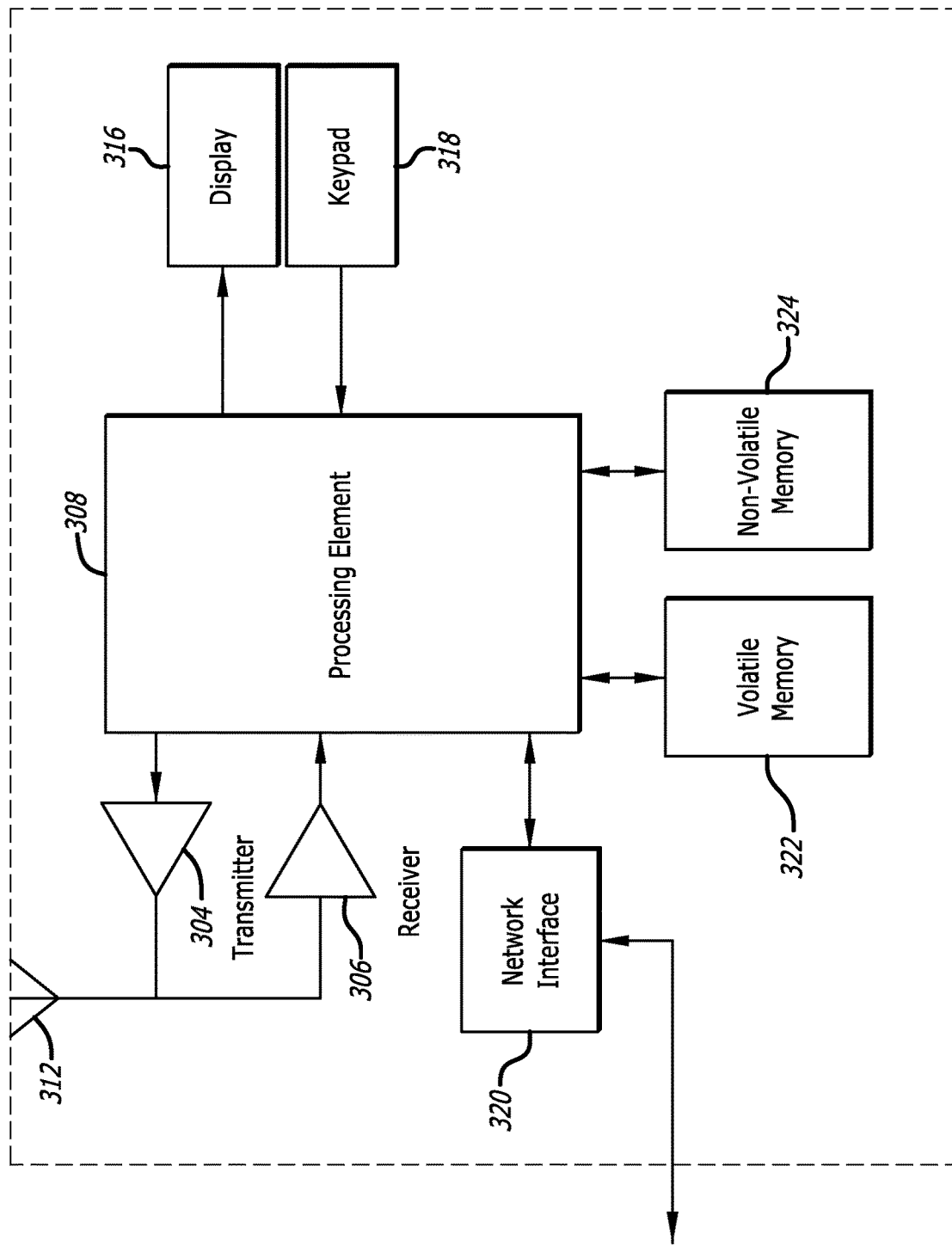
FIG. 3 illustrates an example external computing entity in accordance with some embodiments discussed herein.

FIG. 3 provides an illustrative schematic representative of an external computing entity 102 that may be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. External computing entities 102 may be operated by various parties. As shown in FIG. 3, the external computing entity 102 may include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively. In some embodiments, the external computing entities 102 may refer to a user device associated with a user that may, in whole or in part, store a mobile legal identification data object.

The signals provided to and received from the transmitter 304 and the receiver 306, respectively, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the mobile legal identification processing computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, 4G, 5G, and/or the like. Similarly, the external computing entity 102 may operate in accordance with multiple wired communication standards and protocols, such as those described above with regard to the mobile legal identification processing computing entity 106 via a network interface 320.

Via these communication standards and protocols, the external computing entity 102 may communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 may also download changes, add-ons, and updates, for instance, to its firmware, software (e.g., including executable instructions, applications, program modules), and operating system.

The external computing entity 102 may also comprise a user interface (that may include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the mobile legal identification processing computing entity 106, as described herein. The user input interface may comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 may include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface may be used, for example, to activate or deactivate certain functions, such as screen savers and/or sleep modes.

The external computing entity 102 may also include volatile storage or memory 322 and/or non-volatile storage or memory 324, which may be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory may store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the mobile legal identification processing computing entity 106 and/or various other computing entities.

In another embodiment, the external computing entity 102 may include one or more components or functionality that are the same or similar to those of mobile legal identification processing computing entity 106, as described in greater detail above. As will be recognized, these frameworks and descriptions are provided for exemplary purposes only and are not limiting to the various embodiments.

In various embodiments, the external computing entity 102 may be embodied as an artificial intelligence (AI) computing entity. Accordingly, the external computing entity 102 may be configured to provide and/or receive information/data from a user via an input/output mechanism, such as a display, a video capture device (e.g., camera), a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

Although illustrated as separate entities, the present disclosure contemplates that the components illustrated and described with reference to FIG. 2 may, in some embodiments, be housed in whole or in part in the external computing entity 102. Similarly, the present disclosure contemplates that the components illustrated and described with reference to FIG. 3 may, in some embodiments, be housed in whole or in part in the mobile legal identification processing system 101, the mobile legal identification processing computing entity 106, or any other entity not expressly illustrated in FIGS. 1-3. Said differently, the user interface presenting mobile legal identification data objects and/or authentication action responses generated by the operations described hereafter may be presented by the mobile legal identification processing system 101, the mobile legal identification processing computing entity 106, the external computing entity 102, or any other entity not expressly illustrated in FIGS. 1-3.

Exemplary Operations for Generating a Mobile Legal Identification Data Object

Figure 4:
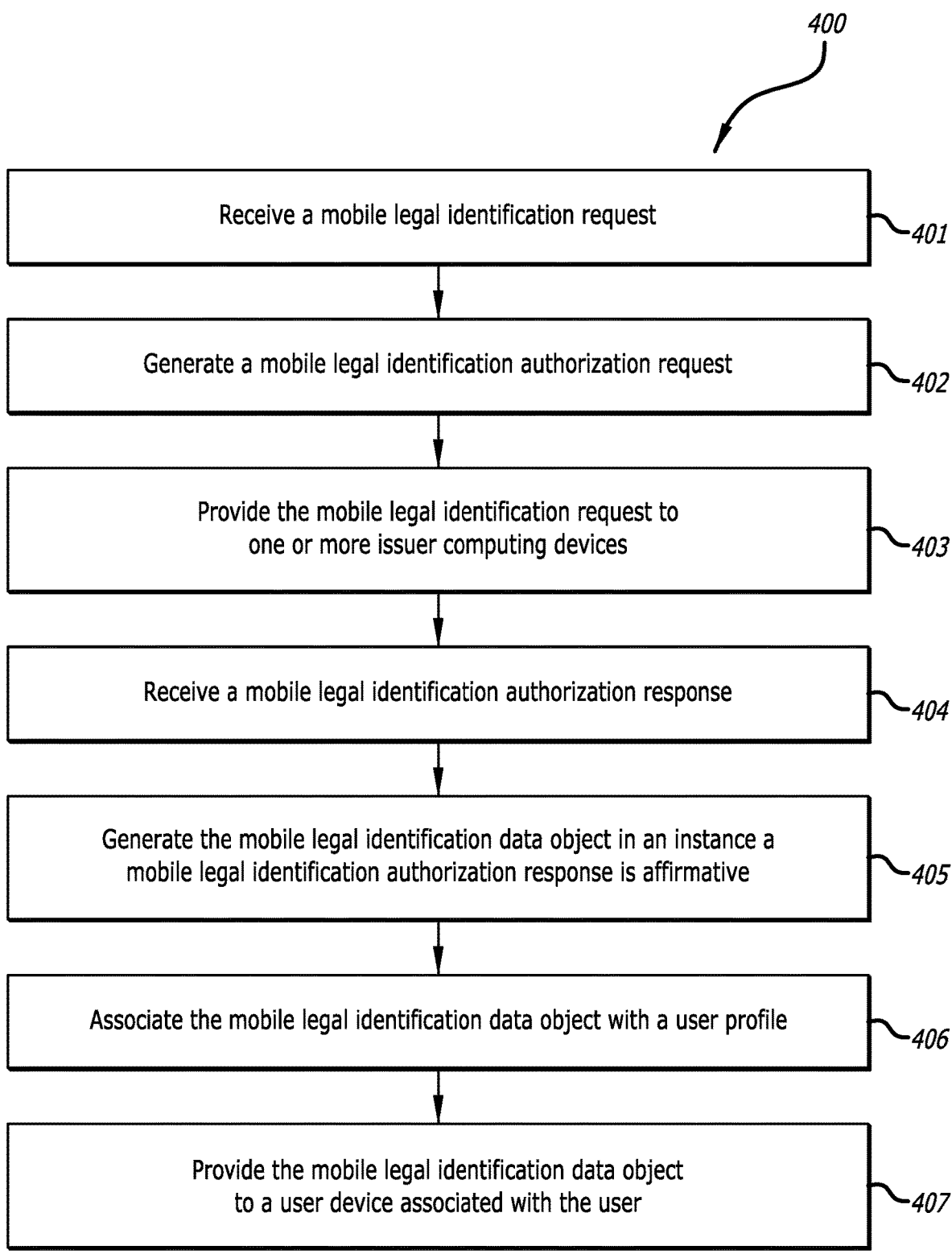
FIG. 4 illustrates an example flowchart for generating a mobile legal identification data object in accordance with some example embodiments described herein.

FIG. 4 illustrates a flowchart containing a series of operations generating a mobile legal identification data object. The operations 400 illustrated in FIG. 4 may, for example, be performed by, with the assistance of, and/or under the control of an apparatus (e.g., mobile legal identification processing computing entity 106), as described above. In this regard, performance of the operations may invoke one or more of processing element 205, volatile memory 215, non-volatile memory 210, and/or network interface 220.

As shown in operation 401, the apparatus (e.g., mobile legal identification processing computing entity 106) includes means, such as processing element 205, volatile memory 215, volatile memory 210, network interface 220, and/or the like, for receiving a mobile legal identification request. In some embodiments, the mobile legal identification request may be received from an external computing entity 102, such as a user device, an automated teller machine (ATM), or the like. In some embodiments, the mobile legal identification request is associated with a request from a user to generate a mobile legal identification data object for the user. Each mobile legal identification request may correspond to a mobile legal identification type of a plurality of candidate mobile legal identification types which may identify a particular user. For example, candidate mobile legal identification types may include a mobile driver's license, birth certificate, state-issued identifier, student identifier, social security card, military card, passport, and/or the like.

In some embodiments, the mobile legal identification request includes mobile legal identification metadata and a user identifier. The user identifier may be any identifier which identifies a user associated with the mobile legal identification request. For example, a user identifier may include a phone number, existing account username, social security number, existing account identifier, email address, customer identifier, and/or the like. The mobile legal identification request metadata may include one or more attributes describing any data associated with the requesting user, user device, and/or mobile legal identification request. For example, the mobile legal identification request metadata may describe attributes including one or more of event data, user device information, location data, user biometric data, user device interaction information, and/or the like.

In some embodiments, event data may include a date and/or time associated with the mobile legal identification request.

In some embodiments, user device information may include user device information such as a user device identifier, user device type (e.g., cell phone, laptop, desktop computer, tablet, etc.), operating system (OS) version, OS name, user device manufacturer, user device model, user device model number, user device service provider, user device feature enablement (e.g., camera enabled, wallet enabled, etc.), one or more auxiliary device identifiers (e.g., Bluetooth connected devices, etc.), the connection status of the one or more auxiliary devices, authenticator used, an indication of whether the device has been authenticated by one or more methods (e.g., authenticated by email, short message service (SMS) text, phone call, etc.) and/or the like. Furthermore, a user device identifier may include any suitable identifier which uniquely identifies the user device. For example, a user device identifier may describe a media access control (MAC) address, international mobile equipment identity (IMEI), international mobile subscriber identity (IMSI), integrated circuit card identifier (ICCID or subscriber identifier module card identifier), phone number, a device name, common device identifier, and/or the like.

In some embodiments, location information may describe the geographic region within which the user device transmits the mobile legal identification request. In some embodiments, the geographic region corresponds to one or more geographic hierarchical levels. For example, a geographic region hierarchical level may include a country location level, state location level, zip code location level, address location level, and/or the like. In some embodiments, the user device location information may describe an internet protocol (IP) address and/or IP location for the user device associated with the authentication action request and/or one or more proxy user devices. In some embodiments, user biometric data may include user biometric data such as user fingerprint data, face scan data, retina scan data, vocal pattern data, gesture data, and/or the like.

In some embodiments, the mobile legal identification request may additionally include legal identification document data. For example, legal identification document data may include one or more images of a legal identification document, one or more images of a user associated with the legal identification document, and/or one or more authentication factors to be associated with the mobile legal identification data object.

Figure 5B:
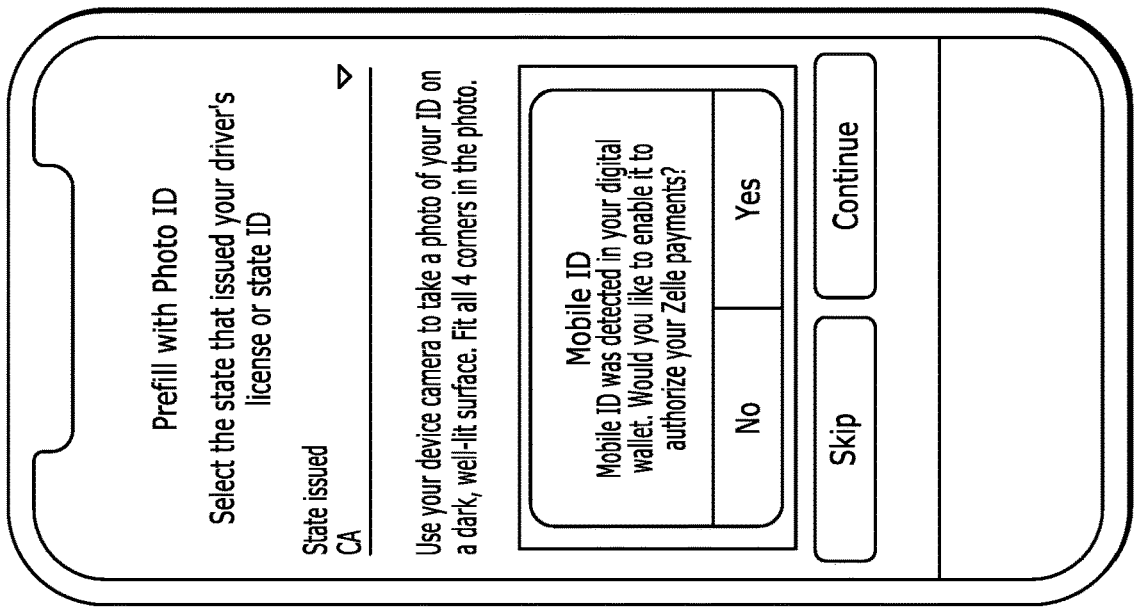
FIGS. 5A-5B illustrate operational examples of a request for a mobile legal identification data object in accordance with some example embodiments described herein.
Figure 5A:
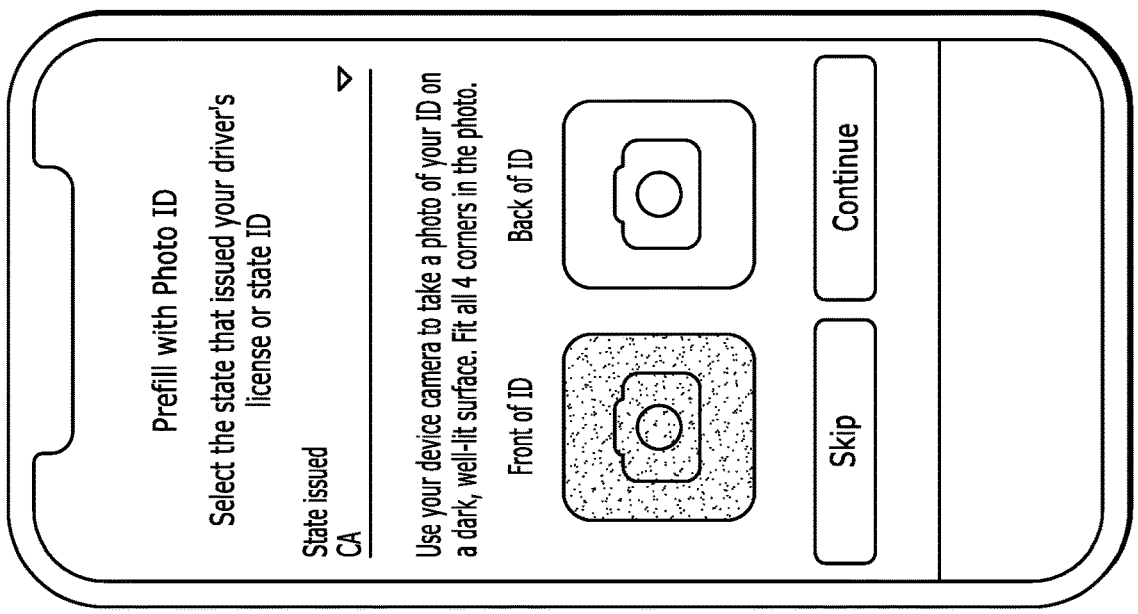

FIGS. 5A-5B depict operational examples of a user input which may be used to provide the mobile legal identification request in accordance with some embodiments. As shown in FIGS. 5A-5B, legal identification document data may be included within the mobile legal identification request 500 and 500'. For example, a legal identification document may be a driver's license and be associated with legal identification document data, including image data of the front and back of the driver's license.

Thereafter, as shown in operation 402, the apparatus (e.g., mobile legal identification processing computing entity 106 and/or mobile legal identification generation engine 110) includes means, such as processing element 205, and/or the like, for generating a mobile legal identification authorization request. The mobile legal authorization request may be generated based at least in part on the mobile legal identification type of the mobile legal identification request. In some embodiments, the mobile legal identification type may be used to determine which issuer computing device to provide the mobile legal identification authorization request to. The mobile legal identification authorization request may include the one or more user identifiers and legal identification document data. As such, an issuer computing entity may compare the received mobile legal identification authorization request to one or more legal identification authorization documents stored and/or associated with the issuer computing entity for the particular user.

Thereafter, as shown in operation 403, the apparatus (e.g., mobile legal identification processing computing entity 106 and/or mobile legal identification generation engine 110) includes means, such as processing element 205, and/or the like, for providing the mobile legal identification request to one or more issuer computing devices. In some embodiments, the mobile legal identification type may be used to determine which issuer computing device to provide the mobile legal identification authorization request to. For example, if the mobile legal identification type is a driver's license, the mobile legal identification authorization request may be provided to a department of motor vehicles (DMV) issuing computing device. In some embodiments, the one or more issuing computing devices associated with a particular mobile legal identification type are stored in an associated memory, such as within storage subsystem 108.

Thereafter, as shown in operation 404, the apparatus (e.g., mobile legal identification processing computing entity 106 and/or mobile legal identification generation engine 110) includes means, such as processing element 205, and/or the like, for receiving a mobile legal identification authorization response. The mobile legal identification data object may be generated based at least in part on the mobile legal identification authorization response. The mobile legal identification authorization response may include one or more legal identification document attributes. For example, the one or more legal identification document attributes may include one or more images of a legal identification document, one or more images of a user associated with the legal identification document, one or more authentication factors, and/or the like. In some embodiments, the mobile legal identification authorization response may provide the one or more legal identification document attributes in an encrypted format. In some embodiments, the mobile legal identification processing computing entity 106 may be configured to generate one or more decryption keys using mobile legal document key generation models such that the legal identification document attributes may be decrypted when appropriate.

As shown in operation 405, the apparatus (e.g., mobile legal identification processing computing entity 106 and/or mobile legal identification generation engine 110) includes means, such as processing element 205, and/or the like, for, in an instance the mobile legal identification authorization response is affirmative, the mobile legal identification generation engine 110 may generate a mobile legal identification data object. In some embodiments, the mobile legal identification data object may include one or more mobile legal identification document attributes based at least in part on the received legal identification document attributes. In some embodiments, the one or more mobile legal identification document attributes may be associated with an authorization access category. The authorization access category for each of the one or more mobile legal identification document attributes may be pre-determined by the one or more issuer computing devices. Alternatively, the authorization access category for each of the one or more mobile legal identification document attributes may be determined by the mobile legal identification generation engine 110. For example, between 1 to n authorization access categories may be determined for n mobile legal identification document attributes. Furthermore, mobile legal identification document attributes corresponding to the same authorization access category may be associated and/or grouped together. In some embodiments, each authorization access category may be hierarchical such that authorization access categories associated with a higher tier (e.g., more selective tier) may also include authorization access categories associated with lower tiers (e.g., less selective tiers).

Figure 6A:
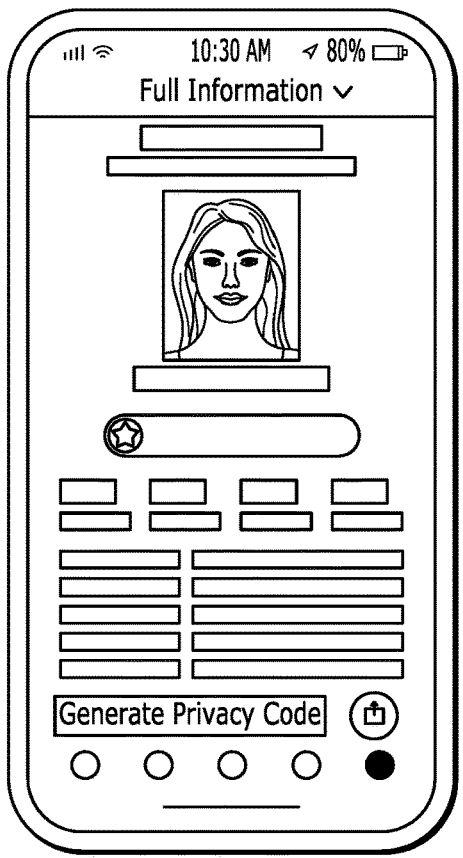
FIGS. 6A-6C illustrate operational examples of mobile legal identification data objects accordance with some example embodiments described herein.
Figure 6B:
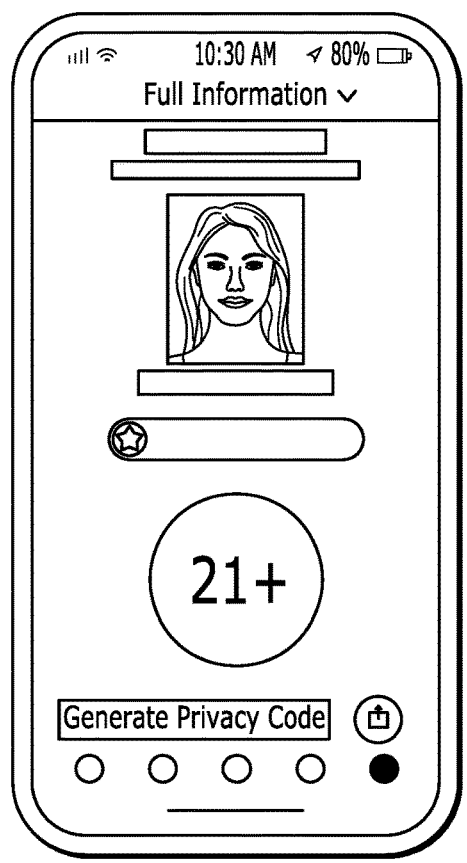
Figure 6C:
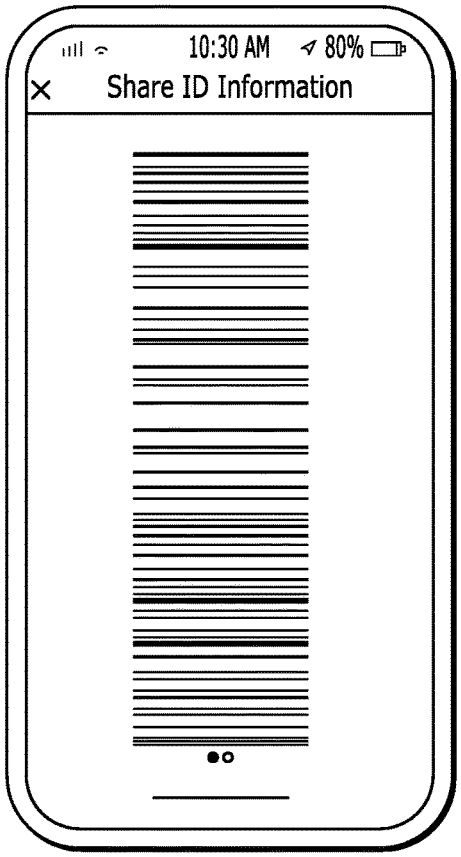

FIGS. 6A-6C depict operational examples of mobile legal identification data objects 600, 600', and 600'' in accordance with some embodiments. As shown in FIGS. 6A-6C, the mobile legal identification data objects include mobile legal identification document data such as text data, image data, and/or authorization data. The authorization data depicted in FIG. 6C may correspond to a barcode identifier (e.g., any form of scannable indicia). The barcode identifier may be scanned by one or more external user devices and be associated with a legal identification document, such as a driver's license.

Thereafter, as shown in operation 406, the apparatus (e.g., mobile legal identification processing computing entity 106 and/or mobile legal identification generation engine 110), includes means, such as processing element 205, and/or the like, for associating the mobile legal identification data object with a user profile. In some embodiments, a user profile may be associated with a particular user and may be identified by a unique user profile identifier. The unique user profile identifier may be used to uniquely identify and/or distinguish one or more user profiles from one another. For example, a user identifier may include a username, account number, phone number, email address, customer identifier, and/or the like. The apparatus may use the one or more user identifiers provided in the mobile legal identification request to determine a user profile within which to store the mobile legal identification data object.

Thereafter, as shown in operation 407, the apparatus (e.g., mobile legal identification processing computing entity 106 and/or mobile legal identification generation engine 110), includes means, such as processing element 205, network interface 220 and/or the like, for providing the mobile legal identification data object to a user device associated with the user. In some embodiments, the apparatus may be further configured to query a user profile to determine one or more user devices corresponding to a user identified by the received user identifier. In some embodiments, the apparatus may select a user device based at least in part on a device type. For example, the apparatus may be configured to select a user device associated with a mobile phone device type. Alternatively, the apparatus may provide the mobile legal identification data object to the user device from which the mobile legal identification request was received.

Figure 7:
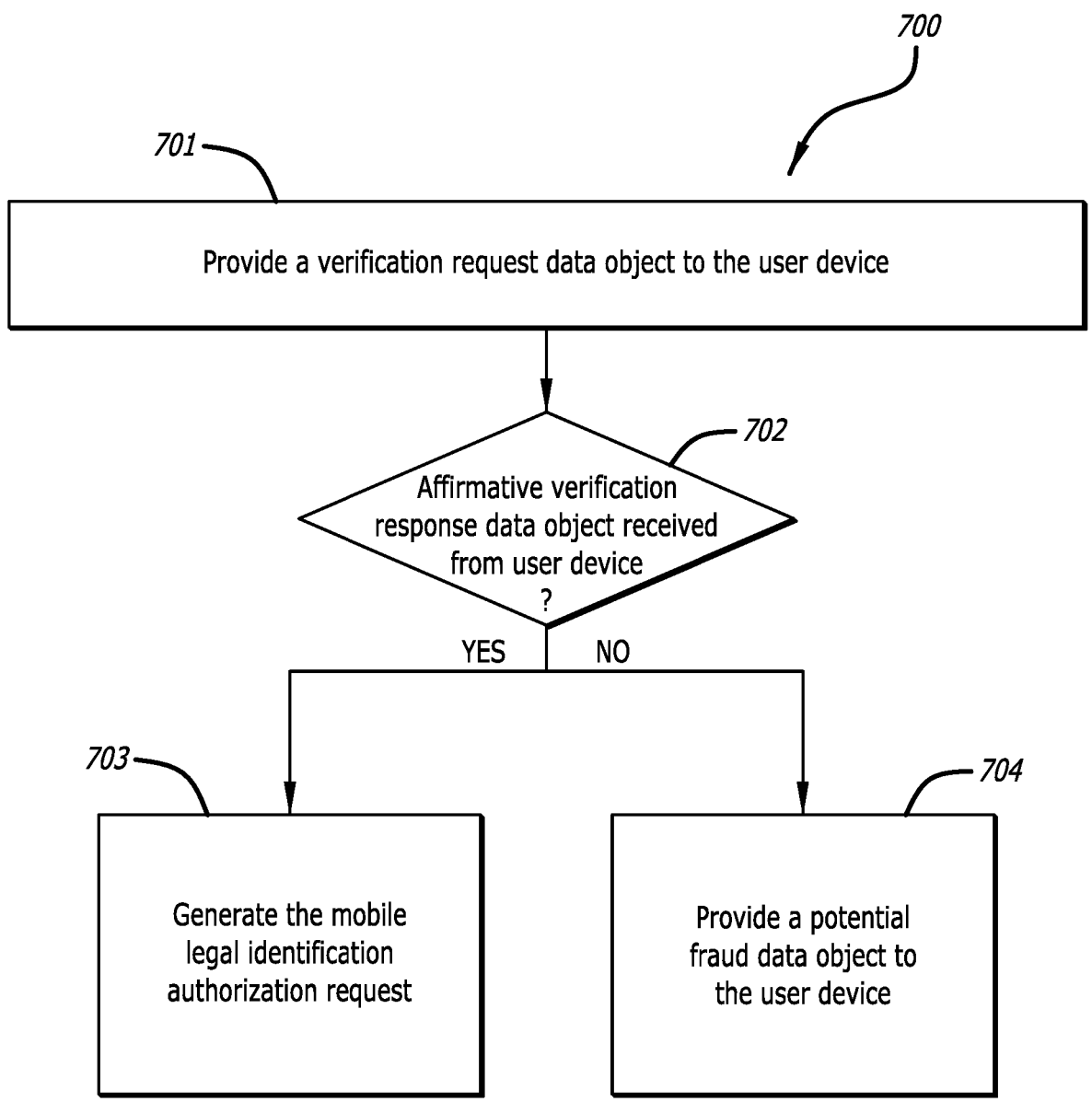
FIG. 7 illustrates an example flowchart for providing a verification request data object to a user device in accordance with some example embodiments described herein.

Turning next to FIG. 7, a flowchart is shown for providing a verification request data object to a user device. The operations 700 illustrated in FIG. 7 may, for example, be performed by, with the assistance of, and/or under the control of an apparatus (e.g., mobile legal identification processing computing entity 106 and/or mobile legal identification generation engine 110), as described above. In this regard, performance of the operations may invoke one or more of processing element 205, volatile memory 215, non-volatile memory 210, and/or network interface 220.

As shown in operation 701, the apparatus (e.g., mobile legal identification processing computing entity 106 and/or mobile legal identification generation engine 110) includes means, such as processing element 205, network interface 220, or the like, for providing a verification request data object to a user device associated with the user profile. In some embodiments, the apparatus may provide the verification data object to the user device in response to receiving a mobile legal identification request. In some embodiments, the apparatus may query a user profile associated with a user identifier described by the mobile legal identification request to determine a user device to provide the verification request data object. In some embodiments, the user device to which the verification request data object is provided and the user device which provided the mobile legal identification data object request are the same user device.

The verification data object request may be used to confirm whether the mobile legal identification data object request associated with the user identifier was requested by a user to which the mobile legal identification data object pertains. In some embodiments, the verification request data object may include mobile legal identification request data and/or mobile legal identification request metadata. For example, the verification request data object may include a time the mobile legal identification request was received, a location the mobile legal identification request was received, and/or the like. The verification request data object may also include one or more inputs for user response. For example, the one or more inputs for a user response may include a confirmation or denial indication such that a user may select a confirmation indication to confirm and/or authentic the mobile legal identification request or select the denial indication to decline the mobile legal identification request. In some embodiments, the verification request data object may further be associated with a maximum verification request time threshold. The maximum verification request time threshold may define a maximum duration of time between when the verification request is sent and when user input may be received. In an instance a user does not respond to the verification request data object within the time defined by the maximum verification request time threshold, the mobile legal identification request may automatically be declined.

Thereafter, as shown in operation 702, the apparatus (e.g., mobile legal identification processing computing entity 106 and/or mobile legal identification generation engine 110) includes means, such as processing element 205, network interface 220 or the like, for determining whether an affirmative verification response data object was received from the user device. The apparatus may determine whether an affirmative verification data response data object was received based at least in part on user interaction with the verification data object request. The verification response data object may describe one or more user interactions with the verification request data object. For example, the verification response data object may indicate whether an end user selected a confirmation indication, denial indication, or did not select an indication based at least in part on the one or more user inputs for the verification request data object within the maximum verification request time threshold.

Thereafter, as shown in operation 703, in an instance an affirmative verification response data object is received from the user device, the apparatus (e.g., mobile legal identification processing computing entity 106 and/or mobile legal identification generation engine 110) includes means, such as processing element 205, volatile memory 215, non-volatile memory 210, or the like, for generating mobile legal identification authorization request as described with respect to operation 402 of FIG. 4

Alternatively, as shown in operation 704, in an instance an affirmative verification response data object is not received from the user device, the apparatus (e.g., mobile legal identification processing computing entity 106 and/or mobile legal identification generation engine 110) includes means, such as processing element 205, volatile memory 215, non-volatile memory 210, or the like, for providing a potential fraud data object to the user device associated with the user profile. A potential fraud data object may be indicative of a failed attempt of to generate the mobile legal identification data object. In some embodiments, the potential fraud data object may be configured to describe a time the mobile legal identification request was received, a location the mobile legal identification request was received, and/or the like.

Figure 8:
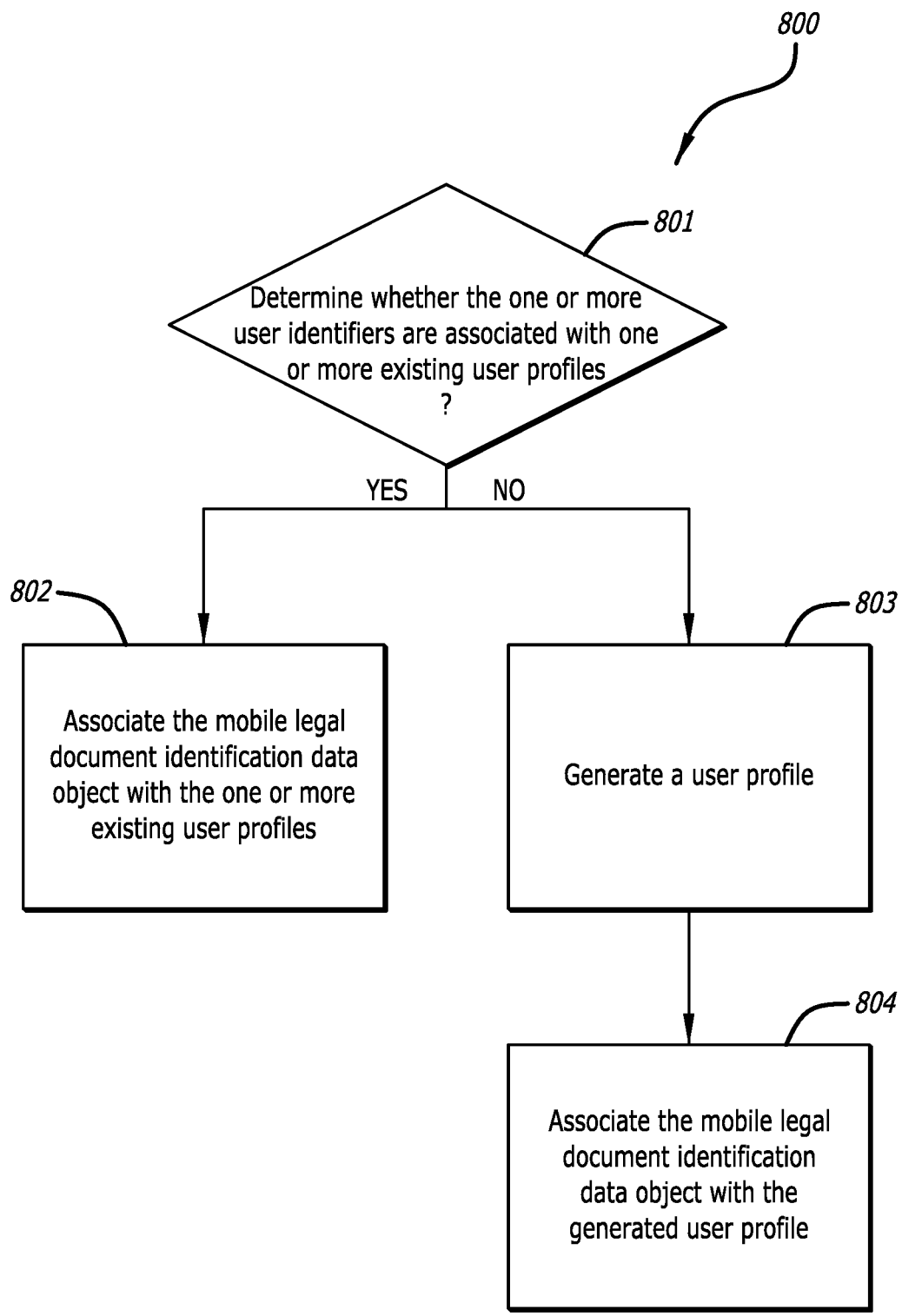
FIG. 8 illustrates an example flowchart for associating a mobile legal identification data object with a user profile in accordance with some example embodiments described herein.

Turning next to FIG. 8, a flowchart is shown for associating the mobile legal identification data object with a user profile. The operations 800 illustrated in FIG. 8 may, for example, be performed by, with the assistance of, and/or under the control of an apparatus (e.g., mobile legal identification processing computing entity 106 and/or mobile legal identification generation engine 110), as described above. In this regard, performance of the operations may invoke one or more of processing element 205, volatile memory 215, non-volatile memory 210, and/or network interface 220.

As shown in operation 801, the apparatus (e.g., mobile legal identification processing computing entity 106 and/or mobile legal identification generation engine 110) includes means, such as processing element 205, volatile memory 215, non-volatile memory 210, or the like, for determining whether the one or more user identifiers are associated with one or more existing user profiles. In some embodiments, the apparatus may query a user profile database for a user profile which is associated with the one or more user identifiers as received from the mobile legal identification request.

Thereafter, as shown in operation 802, in an instance one or more user identifiers are associated with one or more existing user profiles, the apparatus (e.g., mobile legal identification processing computing entity 106 and/or mobile legal identification generation engine 110) includes means, such as processing element 205, volatile memory 215, non-volatile memory 210, or the like, for associating the mobile legal identification data object with one or more existing user profiles. In an instance the apparatus determines one or more existing user profiles based at least in part on the one or more provide user identifiers, the apparatus may associate the mobile legal identification data object with the one or more existing user profiles. In some embodiments, the apparatus stores the mobile legal identification data object within the one or more user profiles. In some embodiments, the apparatus stores the mobile legal identification data object within a mobile legal identification data object repository and maps the mobile legal identification data object to the one or more existing user profiles.

Alternatively, as shown in operation 803, in an instance one or more user identifiers aren't associated with existing user profiles, the apparatus (e.g., mobile legal identification processing computing entity 106 and/or mobile legal identification generation engine 110) includes means, such as processing element 205, volatile memory 215, non-volatile memory 210, or the like, for generating a user profile. In some embodiments, the apparatus generates a user profile based at least in part on the mobile legal identification request and/or mobile legal identification authorization response. The generated user profile may be stored in a user profile database.

Thereafter, as shown in operation 804, the apparatus (e.g., mobile legal identification processing computing entity 106 and/or mobile legal identification generation engine 110) includes means, such as processing element 205, volatile memory 215, non-volatile memory 210, or the like, for associating the mobile legal identification data object with the generated user profile. The apparatus may associate the mobile legal identification data object with the generated user profile. In some embodiments, the apparatus stores the mobile legal identification data object within the user profile. In some embodiments, the apparatus stores the mobile legal identification data object within a mobile legal identification data object repository and maps the mobile legal identification data object to the user profile.

Exemplary Operations for Processing an Authentication Action Request

Figure 9:
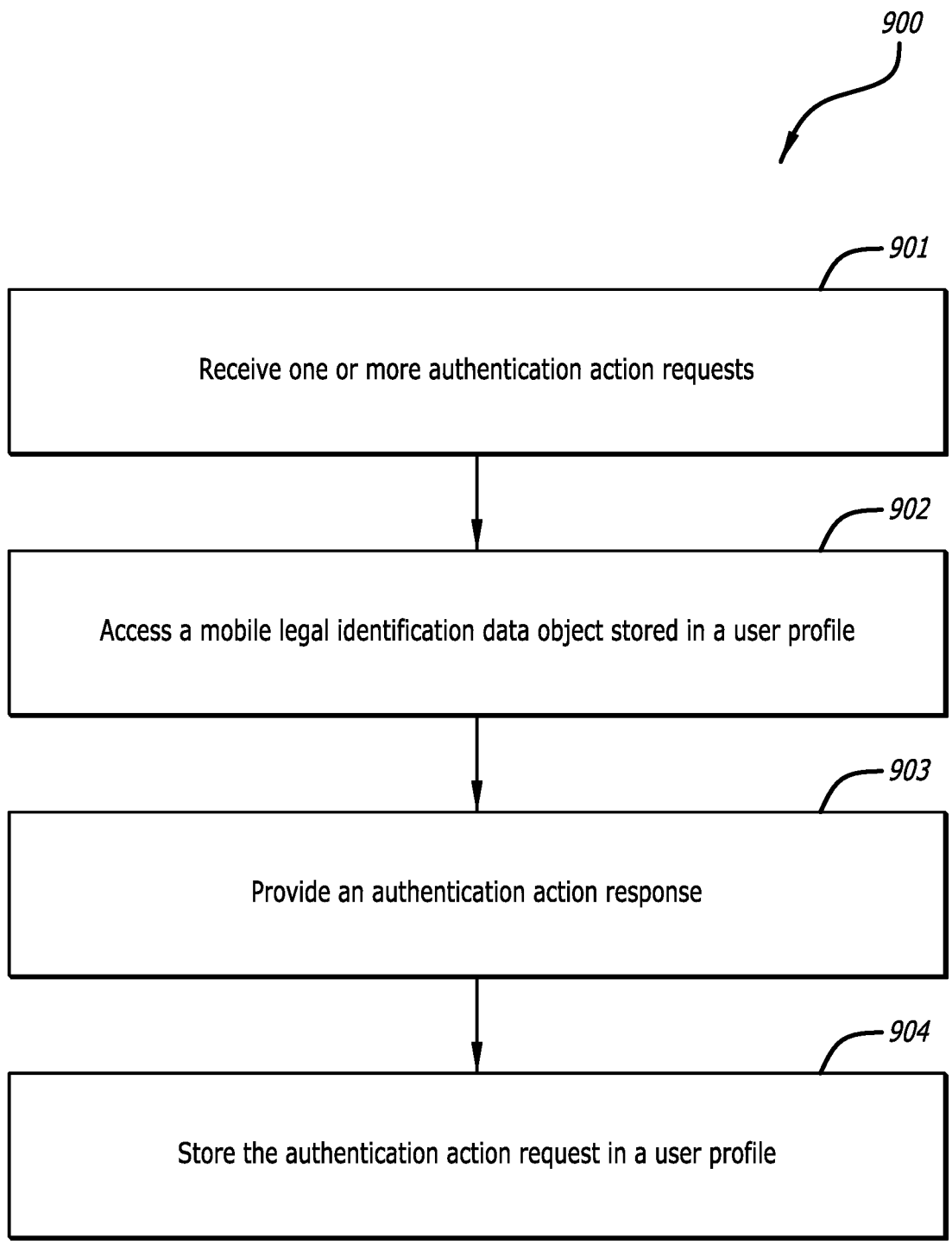
FIG. 9 illustrates an example flowchart for receiving one or more authentication action requests in accordance with some example embodiments described herein.

Turning next to FIG. 9, a flowchart is shown for receiving one or more authentication action requests. The operations 900 illustrated in FIG. 9 may, for example, be performed by, with the assistance of, and/or under the control of an apparatus (e.g., mobile legal identification processing computing entity 106 and/or mobile legal identification authorization engine 112), as described above. In this regard, performance of the operations may invoke one or more of processing element 205, volatile memory 215, non-volatile memory 210, and/or network interface 220.

As shown in operation 901, the apparatus (e.g., mobile legal identification processing computing entity 106 and/or mobile legal identification authorization engine 112), includes means, such as processing element 205, volatile memory 215, non-volatile memory 210, or the like, for receiving one or more authentication action requests. The authentication action request may be a request from a user to perform one or more events, services, actions, functions, and/or the like for a corresponding user account. Each authentication action request may correspond to an authentication action request type of a plurality of candidate authentication action request types. For example, candidate authentication action request types may include a request for age identification, request to board a plane, request to rent a car, request for state service, request for full mobile legal identification document review, request to login to a user account, transfer funds to and/or from one or more financial accounts, change a password associated with a user account, open a new account for the user, check the status of one or more financial accounts, and/or the like.

Furthermore, each authentication action request type may correspond to an authorization access category of a plurality of candidate authorization access categories. Each authorization access category may be associated with a set of one or more decryption rules configured to describe which decryption keys are to be provided with the mobile legal identification data object. In some embodiments, the authentication action request includes authentication action metadata and a user identifier. The user identifier may be any identifier which identifies a user associated with the authentication action request. For example, a user identifier may include a username, account number, phone number, email address, customer identifier, and/or the like. The authentication action request metadata may include one or more attributes describing any data associated with the requesting user, user device, and/or authentication request. For example, the authentication action request metadata may describe attributes including one or more of event data, user device information, location data, user biometric data, user device interaction information, and/or the like.

In some embodiments, event data may include a date and/or time associated with the authentication action request. Event data may additionally or alternatively include an authentication action request type associated with the authentication action request. Each authentication action request type may correspond to an authentication action request type of a plurality of candidate authentication action request types. For example, candidate authentication action request types may include a request to login to a user account, transfer funds to and/or from one or more financial accounts, change a password associated with a user account, open a new account for the user, check the status of one or more financial accounts, and/or the like.

In some embodiments, user device information may include user device information such as a user device identifier, user device type (e.g., cell phone, laptop, desktop computer, tablet, etc.), operating system (OS) version, OS name, user device manufacturer, user device model, user device model number, user device service provider, user device feature enablement (e.g., camera enabled, wallet enabled, etc.), one or more auxiliary device identifiers (e.g., Bluetooth connected devices, etc.), the connection status of the one or more auxiliary devices, authenticator used, an indication of whether the device has been authenticated by one or more methods (e.g., authenticated by email, short message service (SMS) text, phone call, etc.) and/or the like. Furthermore, a user device identifier may include any suitable identifier which uniquely identifies the user device. For example, a user device identifier may describe a media access control (MAC) address, international mobile equipment identity (IMEI), international mobile subscriber identity (IMSI), integrated circuit card identifier (ICCID or subscriber identifier module card identifier), phone number, a device name, common device identifier, and/or the like.

In some embodiments, location information may describe the geographic region within which the user device transmits the authentication action request. In some embodiments, the geographic region corresponds to one or more geographic hierarchical levels. For example, a geographic region hierarchical level may include a country location level, state location level, zip code location level, address location level, and/or the like. In some embodiments, the user device location information may describe an internet protocol (IP) address and/or IP location for the user device associated with the authentication action request and/or one or more proxy user devices.

In some embodiments, user biometric data may include user biometric data such as user fingerprint data, face scan data, retina scan data, vocal pattern data, gesture data, and/or the like.

In some embodiments, user device interaction information may include data describing the way an end user interacts with the device. For example, user device interaction information may include user swiping patterns, user keystroke patterns, user orientation patterns (e.g., how the user holds a mobile device), and/or the like. In some embodiments, user device interaction information may be derived from other data sources.

Thereafter, as shown in operation 902, the apparatus (e.g., mobile legal identification processing computing entity 106 and/or mobile legal identification authorization engine 112),) includes means, such as processing element 205, volatile memory 215, non-volatile memory 210, or the like, for accessing a mobile legal identification data object stored in a user profile. The apparatus may be configured to query a user profile database to determine a user profile associated with the one or more user identifiers provided by the authentication action request. The apparatus may be access and/or extract the mobile legal identification data object associated with the user profile from the user profile or alternatively, from a mobile legal identification data object repository.

Thereafter, as shown in operation 903, the apparatus (e.g., mobile legal identification processing computing entity 106 and/or mobile legal identification authorization engine 112), includes means, such as processing element 205, volatile memory 215, non-volatile memory 210, or the like, for providing an authentication action response. In some embodiments, the authentication action response may be generated by the apparatus and may include the mobile legal identification data object corresponding to the user identified by the one or more user identifiers.

Thereafter, as shown in operation 904, the apparatus (e.g., mobile legal identification processing computing entity 106 and/or mobile legal identification authorization engine 112), includes means, such as processing element 205, volatile memory 215, non-volatile memory 210, or the like, for storing the authentication action request in a user profile. In some embodiments, the apparatus may be configured to store the authentication action request with the user profile associated with the user identified by the one or more user identifiers. As such, access to the user profile and/or mobile legal identification data object associated with the user profile may be monitored, tracked, and/or assessed.

Figure 10:
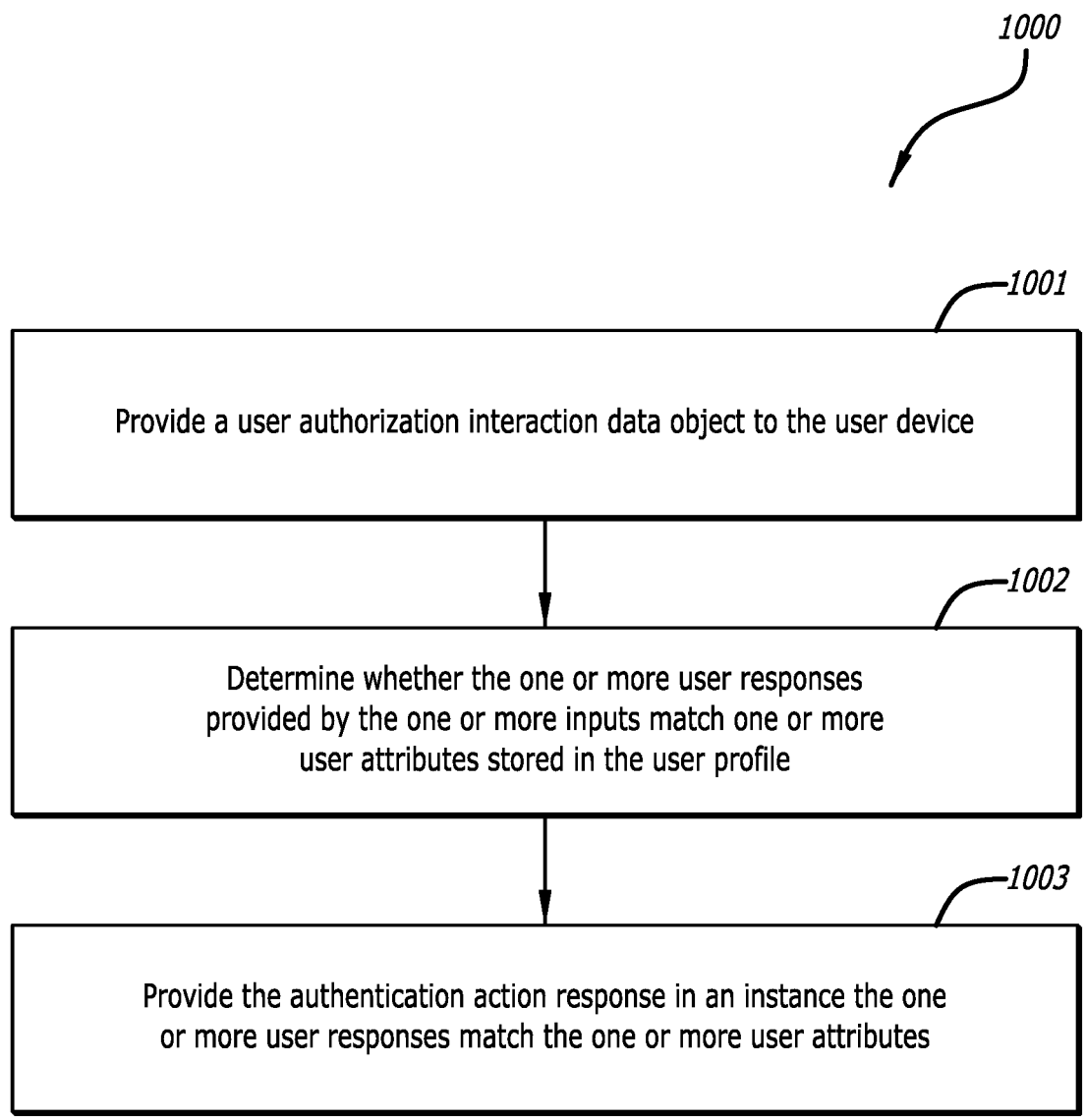
FIG. 10 illustrates an example flowchart for providing a user authorization interaction data object to the user device in accordance with some example embodiments described herein.

Turning next to FIG. 10, a flowchart is shown for receiving one or more authentication action requests. The operations 1000 illustrated in FIG. 10 may, for example, be performed by, with the assistance of, and/or under the control of an apparatus (e.g., mobile legal identification processing computing entity 106 and/or mobile legal identification authorization engine 112), as described above. In this regard, performance of the operations may invoke one or more of processing element 205, volatile memory 215, non-volatile memory 210, and/or network interface 220.

As shown in operation 1001, the apparatus (e.g., mobile legal identification processing computing entity 106 and/or mobile legal identification authorization engine 112),) includes means, such as processing element 205, volatile memory 215, non-volatile memory 210, or the like, for providing a user authorization interaction data object to a user device associated with a user profile. In some embodiments, the apparatus may generate a user authorization data object which is then provided to a user device. In some embodiments, the apparatus may be further configured to query a user profile to determine one or more user devices corresponding to a user identified by the received user identifier. In some embodiments, the apparatus may select a user device based at least in part on a device type. For example, the apparatus may be configured to select a user device associated with a mobile phone device type. Alternatively, the apparatus may provide the mobile legal identification data object to the user device from which the authentication action request.

The user authorization interaction data object may include one or more inputs for a user response. In some embodiments, the one or more inputs for user response include one or more inputs for biometric data (e.g., fingerprint scan, face scan, vocal pattern capture, retina scan, and/or the like), an indication for a method of providing an authentication action response, and/or one or more user authentication attributes (e.g., a PIN number, passcode, and/or the like).

Thereafter, as shown in operation 1002, the apparatus (e.g., mobile legal identification processing computing entity 106 and/or mobile legal identification authorization engine 112) includes means, such as processing element 205, volatile memory 215, non-volatile memory 210, or the like, for determining one or more authorization match scores based at least in part upon one or more user responses. In some embodiments, the apparatus may use an authorization action determination machine learning mode to determine the one or more authorization match scores.

In some embodiments, the authorization action determination machine learning model is configured to describe parameters, hyper-parameters, and/or stored operations of a machine learning model that is configured to generate an authorization match score for a received user authorization interaction data object. In some embodiments, the authorization action determination machine learning model may be configured to process one or more received user authorization interaction data objects, a user interactions data object and/or one or more user attributes from an associated user profile to generate an authorization match score for the received user authorization interaction data object. In some embodiments, the authorization action determination machine learning model may be configured to generate the authorization match score for the received user authorization interaction data object based at least in part on an inferred similarity between one or more received user authorization interaction data objects, a user interactions data object and/or one or more user attributes from an associated user profile.

In some embodiments, an authorization match score may be any numeric value. In some embodiments, the authorization action determination machine learning model may be configured to determine one or more authorization match score classifications for the authorization match score. The authorization match score classifications categories may include, but are not limited to, an authorized classification and a non-authorized classification. Each classification category may be defined by one or more authorization match score values. For example, a non-authorized classification category may be defined by authorization match score values between 0-65 and an authorized classification category may be defined by authorization match scores values between 66-100.

In some embodiments, the authorization action determination machine learning model may employ any suitable clustering algorithms including but not limited to affinity propagation, agglomerative clustering, balanced iterative reducing and clustering using hierarchies (BIRCH), density-based spatial clustering of applications with noise (DB-SCAN), k-means, mini-batch k-means, mean shift, ordering points to identify cluster structure (OPTICS), spectral clustering, mixture of Gaussians, and/or the like. In some embodiments, the authorization action determination machine learning model may cluster one or more user response attributes with one or more user attributes stored within a user profile. In some embodiments, the authorization match score may be based at least in part on inter-cluster distance between two or more clusters for a particular user attribute. For example, one cluster may correspond to a fingerprint pattern scan as received from a user authorization interaction data object and a finger pattern scan stored within the corresponding user profile. In some embodiments, each inter-cluster score for one or more attributes of the authorization interaction data object may be used to generate the authorization match score. In some embodiments, the authorization action determination machine learning model may be further configured to determine weights for each of the inter-cluster scores to generate the authorization match score for the user authorization interaction data object. In some embodiments, the one or more authorization action determination machine learning models may be trained to determine or to otherwise derive an optimal configuration and/or to optimize one or more associated hyperparameters. In some embodiments, the parameters and/or hyper-parameters of the authorization action determination machine learning model may be represented as one or more values, such as in an array. The present disclosure contemplates that the action trust score machine learning model may encompass any machine learning, artificial intelligence, or clustering technique and may similarly perform any machine learning technique.

Thereafter, as shown in operation 1003, the apparatus (e.g., mobile legal identification processing computing entity 106 and/or mobile legal identification authorization engine 112), includes means, such as processing element 205, volatile memory 215, non-volatile memory 210, or the like, for providing the authentication action response based at least in part on the one or more authorization match scores as previously described with respect to operation 903 of FIG. 9. In some embodiments the apparatus may determine whether the one or more authorization match scores satisfy one or more authorization match score thresholds.

In an instance the one or more authorization match scores are determined to satisfy the one or more authorization match score thresholds, the apparatus may generate an authentication action response which includes the mobile legal identification data object associated with the user identifier.

In an instance the one or more authorization match scores are determined not to satisfy the one or more authorization match score thresholds, the apparatus may generate an authentication action response indicative of a failure to authenticate the user. As such, the authentication action response may not include the mobile legal identification data object. As such, the mobile legal identification data object may only be provided in instances where the associated user is authenticated via the user authorization interaction data object.

Figure 12:
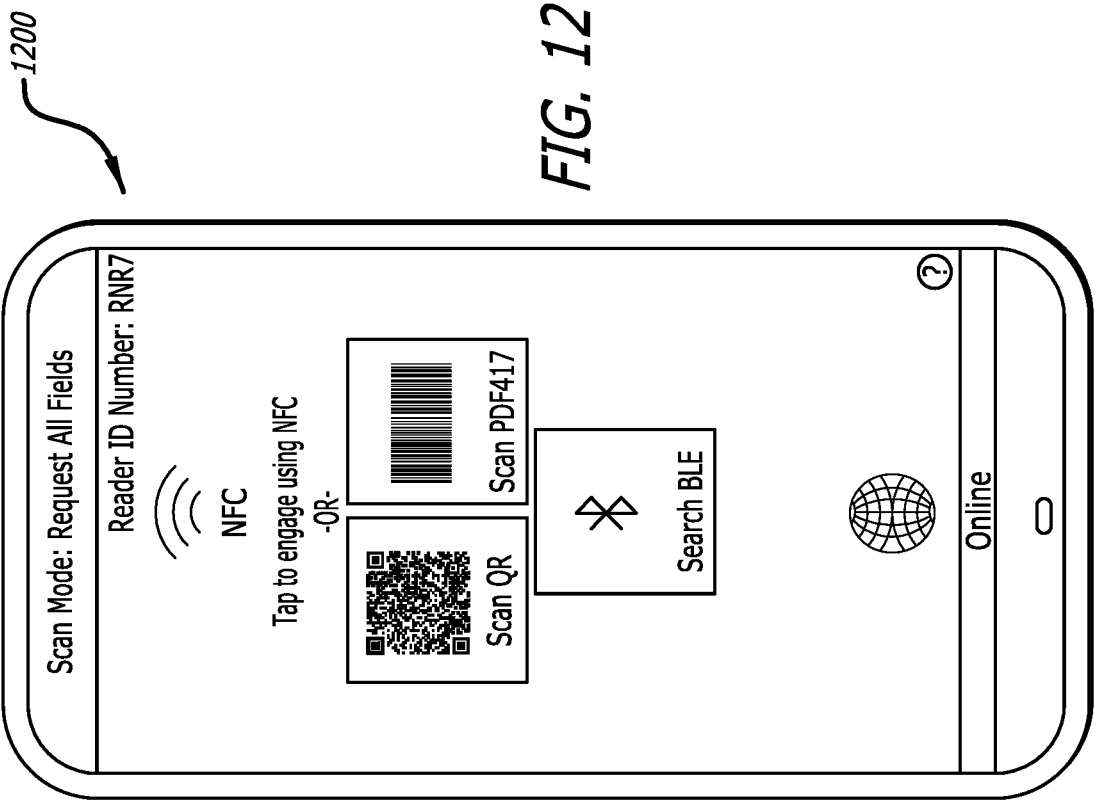
FIGS. 11-13 illustrate operational examples of user authorization interaction data objects in accordance with some example embodiments described herein.
Figure 11:
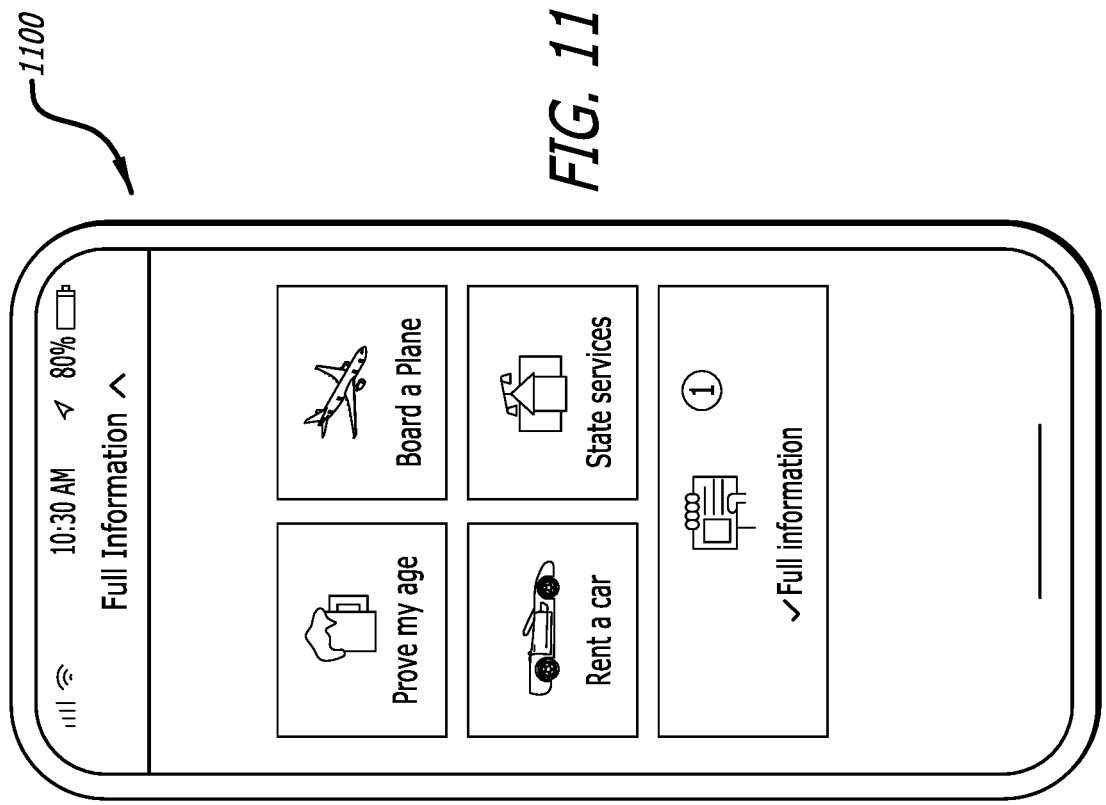
Figure 13:
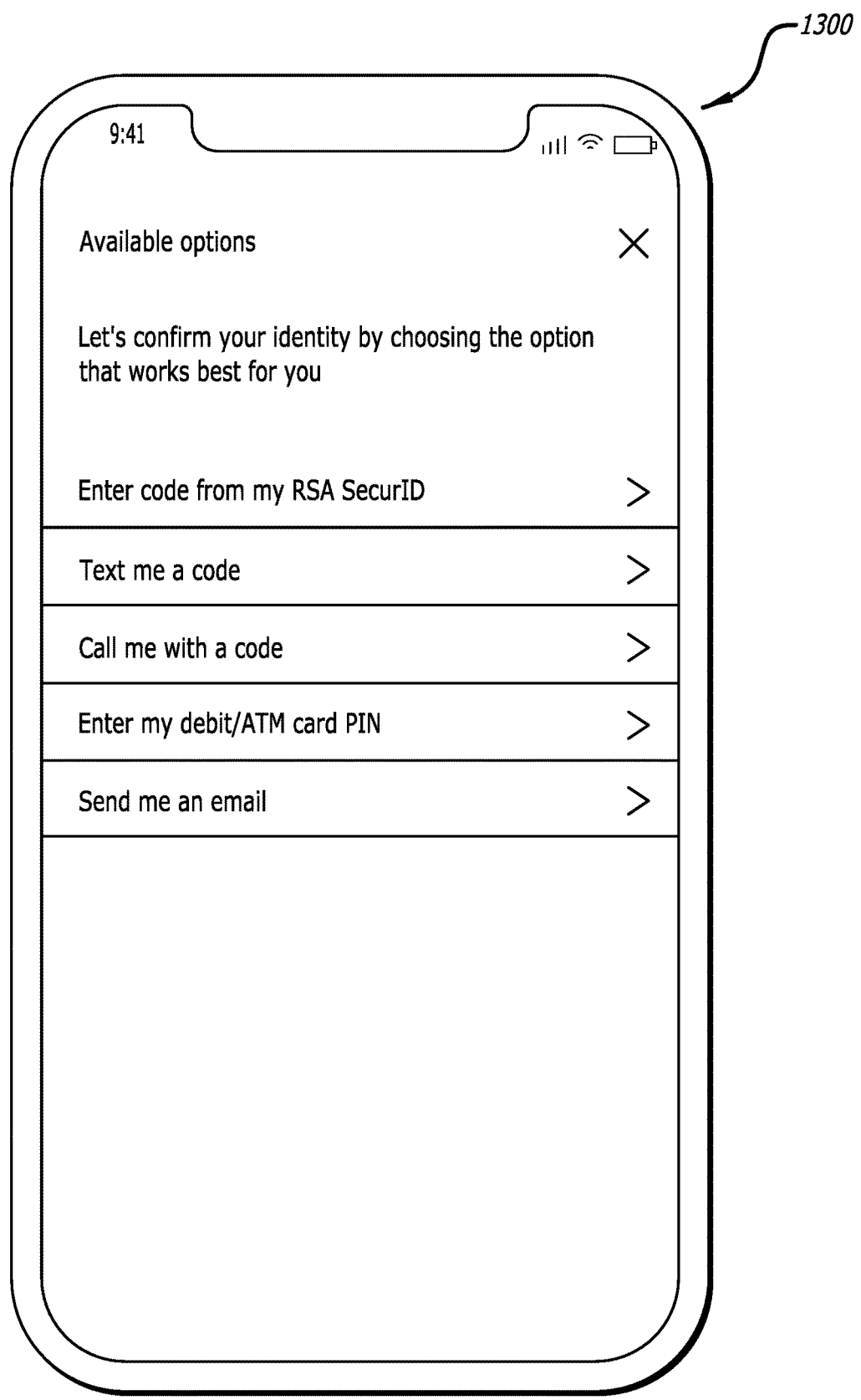

Additionally or alternatively, the apparatus may provide the authentication action response based at least in part on the one or more authorization match score classification categories for the one or more authorization match scores. For example, in an instance, each authorization match score classification category corresponds to an authorized classification category, the apparatus may generate an authentication action response which includes the mobile legal identification data object associated with the user identifier. As another example, in an instance one or more authorization match score classification categories corresponds to a non-authorized classification category, the apparatus may generate an authentication action response indicative of a failure to authenticate the user FIGS. 11-13 depict operational examples of user authorization interaction data objects 1100, 1200, and 1300, respectively, in accordance with some embodiments. As shown in FIG. 11, a user authorization interaction data object 1100 may include one or more inputs for a user response, such as a selection of the authentication action request type. As shown in FIG. 12, a user authorization interaction data object 1200 may include one or more inputs for a user response, such as a method of providing an authentication action response. As shown in FIG. 13, a user authorization interaction data object 1300 may include one or more inputs for a user response, such a selection of one or more methods to provide user authentication attributes.

Figure 14:
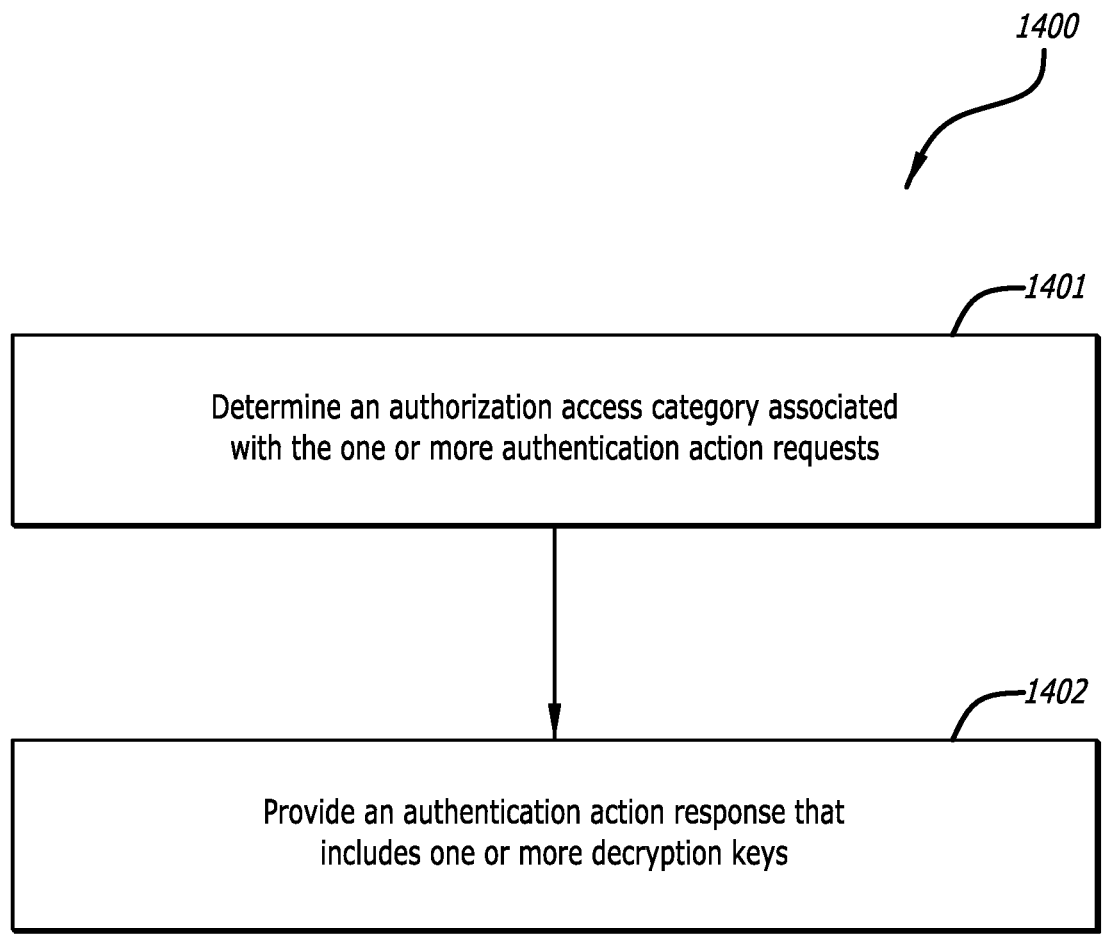
FIG. 14 illustrates an example flowchart for providing one or more decryption keys to the one or more external devices in accordance with some example embodiments described herein.

Turning next to FIG. 14, a flowchart is shown for determining an authorization access category for one or more authentication action requests. The operations 1400 illustrated in FIG. 14 may, for example, be performed by, with the assistance of, and/or under the control of an apparatus (e.g., mobile legal identification processing computing entity 106 and/or mobile legal identification authorization engine 112), as described above. In this regard, performance of the operations may invoke one or more of processing element 205, volatile memory 215, non-volatile memory 210, and/or network interface 220.

As shown in operation 1401, the apparatus (e.g., mobile legal identification processing computing entity 106 and/or mobile legal identification authorization engine 112),) includes means, such as processing element 205, volatile memory 215, non-volatile memory 210, or the like, for determining an authorization access category associated with the one or more authentication action requests. In some embodiments, the apparatus may determine an authorization access category based at least in part on the authentication action request type. Each authentication action request type may correspond to an authentication action request type of a plurality of candidate authentication action request types. For example, candidate authentication action request types may include a request to login to a user account, transfer funds to and/or from one or more financial accounts, change a password associated with a user account, open a new account for the user, check the status of one or more financial accounts, and/or the like. Each candidate authentication action request type may be associated with a particular authorization access category. The authorization access category to which each candidate authentication action request type corresponds may be stored in an associated memory, such as storage subsystem 108. Furthermore, each authentication action request type may correspond to an authorization access category of a plurality of candidate authorization access categories. Each authentication authorization access category may be associated with a set of one or more decryption rules configured to describe which decryption keys are to be provided with the mobile legal identification data object.

As shown in operation 1402, the apparatus (e.g., mobile legal identification processing computing entity 106 and/or mobile legal identification authorization engine 112),) includes means, such as processing element 205, volatile memory 215, non-volatile memory 210, or the like, for providing an authentication action response which includes one or more decryption keys based at least in part on the authentication authorization access category for the authentication action request. In some embodiments, the apparatus may determine the one or more decryption keys to provide using a mobile legal identification key generation model. The mobile legal identification key generation model may be a cryptographic model that may generate one or more mobile legal identification encryption keys and/or one or more mobile legal identification decryption keys. The mobile legal identification key generation model may use any cryptographic algorithms. In some embodiments, the mobile legal identification key generation model may employ asymmetric cryptography to generate one or more mobile legal identification encryption keys and/or one or more mobile legal identification decryption keys. As such, the apparatus may provide the authentication action response with one or more decryption keys such that a receiving user device may decrypt one or more portions of the mobile legal identification data object.

FIGS. 4, 7-10, and 14 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a storage subsystem 108 of the mobile legal identification processing system 101 and executed by a mobile legal identification processing computing entity 106 with an associated processing element 205 of the mobile legal identification processing system 101. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, may be implemented by special purpose hardware-based computer systems which perform the specified functions, or combinations of special purpose hardware with computer instructions.

CONCLUSION

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A computer-implemented method for generating a mobile legal identification data object for a user, the method comprising:
    receiving a mobile legal identification request, wherein the mobile legal identification request comprises at least one or more user identifiers and legal identification document data and is associated with a mobile legal identification type;
    providing a verification request data object to a user device associated with the one or more user identifiers;
    in an instance an affirmative verification response data object is not received from the user device, providing a potential fraudulent data object to the user device, wherein the potential fraudulent data object is indicative of a failed attempt of to generate the mobile legal identification data object;
    in an instance an affirmative verification response data object is received from the user device, generating a mobile legal identification authorization request based at least in part on the mobile legal identification type of the mobile legal identification request, wherein the mobile legal identification authorization request comprises the one or more user identifiers and legal identification document data;
    providing the mobile legal identification authorization request to one or more issuer computing devices;
    receiving a mobile legal identification authorization response, wherein in an instance the mobile legal identification authorization response is affirmative, the mobile legal identification authorization response comprises one or more legal identification data objects;
    generating the mobile legal identification data object based at least in part on the received mobile legal identification authorization response; and
    providing the mobile legal identification data object to the user device associated with the one or more user identifiers.

2. The computer-implemented method according to claim 1, further comprising storing the mobile legal identification data object in a user profile, wherein the user profile in which the mobile legal identification data object is stored is based at least in part on the one or more user identifiers.

3. The computer-implemented method according to claim 1, further comprising:
    determining whether the one or more user identifiers are associated with one or more existing user profiles;

in an instance the one or more user identifiers are determined to be associated with one or more existing user profiles, associating the mobile legal identification data object with the one or more existing user profiles; and in an instance the one or more user identifiers are determined to not be associated with one or more existing user profiles:

generating a user profile; and associating the mobile legal identification data object with the generated user profile.

4. The computer-implemented method according to claim 1, wherein the mobile legal identification data object comprises at least one of one or more images of a legal identification document, one or more images of a user associated with the legal identification document, or one or more authentication factors.

5. The computer-implemented method according to claim 1, wherein the one or more user identifiers comprise at least one of a phone number, existing account username, social security number, existing account identifier, email address, or customer identifier.

6. The computer-implemented method according to claim 1, the method further comprising:

receiving one or more update event data objects from the one or more legal issuer computing devices; and updating the mobile legal identification data object based at least in part on the one or more update event data objects.

7. The computer-implemented method according to claim 1, the method further comprising:

receiving an authentication action request, wherein the authentication action request corresponds to an authentication action request type; and in response to receiving the authentication action request, providing an authentication response that includes the mobile legal identification data object corresponding to the user.

8. The computer-implemented method according to claim 7, the method further comprising storing the authentication action request in a user profile of the user.

9. An apparatus for generating a mobile legal identification data object for a user, the apparatus comprising at least one processor and at least one memory, the at least one memory having computer-code instructions stored thereon that, in execution with the at least one processor, configure the apparatus to:

receive a mobile legal identification request, wherein the mobile legal identification request comprises at least one or more user identifiers and legal identification document data and is associated with a mobile legal identification type;

provide a verification request data object to a user device associated with the one or more user identifiers;

in an instance an affirmative verification response data object is not received from the user device, provide a potential fraudulent data object to the user device, wherein the potential fraudulent data object is indicative of a failed attempt of to generate the mobile legal identification data object;

in an instance an affirmative verification response data object is received from the user device, generate a mobile legal identification authorization request based at least in part on the mobile legal identification type of the mobile legal identification request, wherein the mobile legal identification authorization request comprises the one or more user identifiers and legal identification document data;

provide the mobile legal identification authorization request to one or more issuer computing devices;

receive a mobile legal identification authorization response, wherein in an instance the mobile legal identification authorization response is affirmative, the mobile legal identification authorization response comprises one or more legal identification data objects;

generate the mobile legal identification data object based at least in part on the received mobile legal identification authorization response; and provide the mobile legal identification data object to the user device associated with the one or more user identifiers.

10. The apparatus according to claim 9, further configured to store the mobile legal identification data object in a user profile, wherein the user profile in which the mobile legal identification data object is stored is based at least in part on the one or more user identifiers.

11. The apparatus according to claim 9, further configured to:

determine whether the one or more user identifiers are associated with one or more existing user profiles;

in an instance the one or more user identifiers are determined to be associated with one or more existing user profiles, associate the mobile legal identification data object with the one or more existing user profiles; and in an instance the one or more user identifiers are determined to not be associated with one or more existing user profiles:

generate a user profile; and associate the mobile legal identification data object with the generated user profile.

12. The apparatus according to claim 9, wherein the mobile legal identification data object comprises at least one of one or more images of a legal identification document, one or more images of a user associated with the legal identification document, or one or more authentication factors.

13. The apparatus according to claim 9, wherein the one or more user identifiers comprise at least one of a phone number, existing account username, social security number, existing account identifier, email address, or customer identifier.

14. The apparatus of claim 9, further configured to:

receive one or more update event data objects from the one or more legal issuer computing devices; and update the mobile legal identification data object based at least in part on the one or more update event data objects.

15. The apparatus according to claim 9, further configured to:

receive an authentication action request, wherein the authentication action request corresponds to an authentication action request type; and in response to receiving the authentication action request, provide an authentication response that includes the mobile legal identification data object corresponding to the user.

16. The apparatus according to claim 15, further configured to store the authentication action request in a user profile of the user.

17. A computer program product for generating a mobile legal identification data object for a user, the computer program product comprising at least one non-transitory computer-readable storage medium having computer program code thereon that, in execution with at least one processor, configures the computer program product for:

receiving a mobile legal identification request, wherein the mobile legal identification request comprises at least one or more user identifiers and legal identification document data and is associated with a mobile legal identification type;

providing a verification request data object to a user device associated with the one or more user identifiers;

in an instance an affirmative verification response data object is not received from the user device, providing a potential fraudulent data object to the user device, wherein the potential fraudulent data object is indicative of a failed attempt of to generate the mobile legal identification data object;

in an instance an affirmative verification response data object is received from the user device, generating a mobile legal identification authorization request based at least in part on the mobile legal identification type of the mobile legal identification request, wherein the mobile legal identification authorization request comprises the one or more user identifiers and legal identification document data;

providing the mobile legal identification authorization request to one or more issuer computing devices;

receiving a mobile legal identification authorization response, wherein in an instance the mobile legal identification authorization response is affirmative, the mobile legal identification authorization response comprises one or more legal identification data objects;

generating the mobile legal identification data object based at least in part on the received mobile legal identification authorization response; and providing the mobile legal identification data object to the user device associated with the one or more user identifiers.

18. The computer program product according to claim 17, further configured for storing the mobile legal identification data object in a user profile, wherein the user profile in which the mobile legal identification data object is stored is based at least in part on the one or more user identifiers.

19. The computer program product according to claim 17, further configured for:

determining whether the one or more user identifiers are associated with one or more existing user profiles;

in an instance the one or more user identifiers are determined to be associated with one or more existing user profiles, associating the mobile legal identification data object with the one or more existing user profiles; and in an instance the one or more user identifiers are determined to not be associated with one or more existing user profiles:

generating a user profile; and associating the mobile legal identification data object with the generated user profile.

20. The computer program product according to claim 17, wherein the mobile legal identification data object comprises at least one of one or more images of a legal identification document, one or more images of a user associated with the legal identification document, or one or more authentication factors.

* * * * *